(12) United States Patent
Ozawa et al.

(10) Patent No.: US 8,249,351 B2
(45) Date of Patent: *Aug. 21, 2012

(54) RECORDING MEDIUM FOR RECORDING LOGICAL STRUCTURE MODEL CREATION ASSISTANCE PROGRAM, LOGICAL STRUCTURE MODEL CREATION ASSISTANCE DEVICE AND LOGICAL STRUCTURE MODEL CREATION ASSISTANCE METHOD

(75) Inventors: Noriaki Ozawa, Kawasaki (JP); Yoshinobu Hotta, Kawasaki (JP); Hiroaki Takebe, Kawasaki (JP); Yusaku Fujii, Kawasaki (JP); Akihiro Minagawa, Kawasaki (JP); Hiroshi Tanaka, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 929 days.

This patent is subject to a terminal disclaimer.

(21) Appl. No.: 12/328,442

(22) Filed: Dec. 4, 2008

(65) Prior Publication Data
US 2009/0148049 A1 Jun. 11, 2009

(30) Foreign Application Priority Data
Dec. 6, 2007 (JP) .................................. 2007-316318

(51) Int. Cl.
*G06K 9/00* (2006.01)
*G06F 7/00* (2006.01)
*G06F 17/00* (2006.01)

(52) U.S. Cl. ......... 382/181; 382/176; 707/810; 715/234

(58) Field of Classification Search .................. 382/181, 382/176; 707/769, 602, 802, 999.1, 999, 707/809, 828, 810, 790; 360/15, 48; 386/278; 715/210, 236, 234, 260, 246, 248; 706/57
See application file for complete search history.

(56) References Cited

U.S. PATENT DOCUMENTS

| | | | | |
|---|---|---|---|---|
| 5,323,312 A * | 6/1994 | Saito et al. | ..................... | 715/210 |
| 5,438,512 A * | 8/1995 | Mantha et al. | ................. | 715/234 |
| 5,633,996 A * | 5/1997 | Hayashi et al. | ................. | 715/246 |
| 5,694,609 A * | 12/1997 | Murata | ........................... | 715/210 |
| 5,742,809 A * | 4/1998 | Hayashi et al. | ........................ | 1/1 |
| 5,802,529 A * | 9/1998 | Nakatsuyama et al. | ....... | 715/210 |
| 8,015,203 B2 * | 9/2011 | Takebe et al. | .................. | 707/769 |

FOREIGN PATENT DOCUMENTS
JP     2006-134106 A     5/2006

* cited by examiner

*Primary Examiner* — Sheela Chawan
(74) *Attorney, Agent, or Firm* — Fujitsu Patent Center

(57) ABSTRACT

A method for assisting in the creation of a logical structure model, which stores, from an image in which character strings associated respectively with a plurality of logical elements constituting a logical structure are described, the logical elements, character strings associated with the logical elements, and the logical structure, wherein character strings in an input image and the logical structure among the character strings in the input image are extracted, a logical element is selected among the plurality of logical elements according to the degrees of similarity between the extracted character strings and the character string associated respectively with the plurality of logical elements stored in the logical structure model, a character string associated with the selected logical element and a character string in the input image associated with the logical element based on the logical structure among the extracted character strings in the input image are extracted.

20 Claims, 19 Drawing Sheets

FIG. 3

```
<class name="申請書" >
  <class name="タイトル" >
    <instance type="string" >*申請書</instance>
    <instance type="string" >*届</instance>
    <class name="申請者" >
      <class name="氏名" >
        <instance type="string" >氏名</instance>
        <instance type="string" >お名前</instance>
        <class name="姓" >
          <instance type="string" >苗字</instance>
          <instance type="string" >姓</instance>
        </class>
        <class name="名" >
          <instance type="string" >名前</instance>
          <instance type="string" >名</instance>
        </class>
      </class>
    </class>
    <class name="申請日" type="date" >
      <class name="年" attr="year" type="number" >
        <instance>2006</instance>
        <instance>2007</instance>
      </class>
      <class name="月" attr="month" type="number" >
        <instance>3</instance>
        <instance>1</instance>
      </class>
      <class name="日" attr="date" type="number" >
        <instance>5</instance>
        <instance>17</instance>
      </class>
    </class>
  </class>
</class>
```

FIG. 9
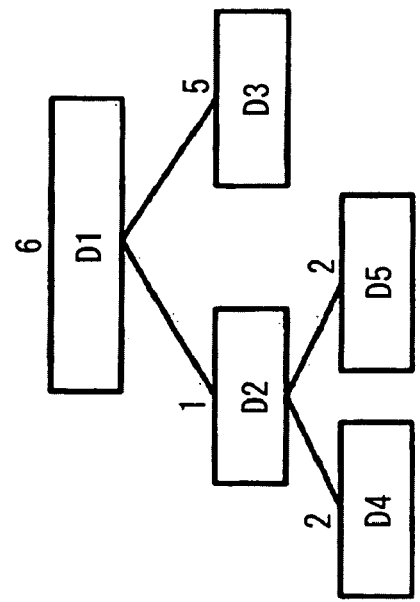
UPPER NUMBER IS DEGREE OF SIMILARITY
THE LOWER THE NUMBER, THE MORE SIMILAR
LOGICAL STRUCTURE OF INPUT FORM
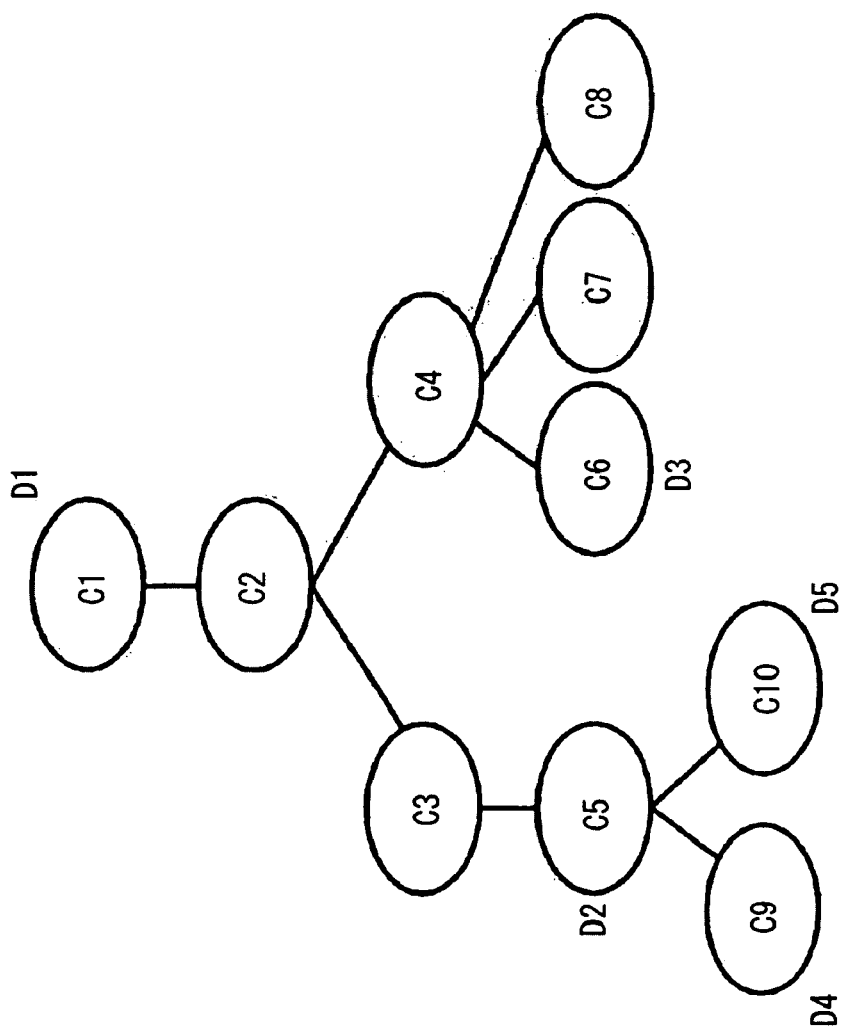
INDICATE THAT NEIGHBORING 'Dns' ARE
CORRELATED AS SIMILAR NODE
LOGICAL STRUCTURE OF GENERAL LOGICAL STRUCTURE MODEL

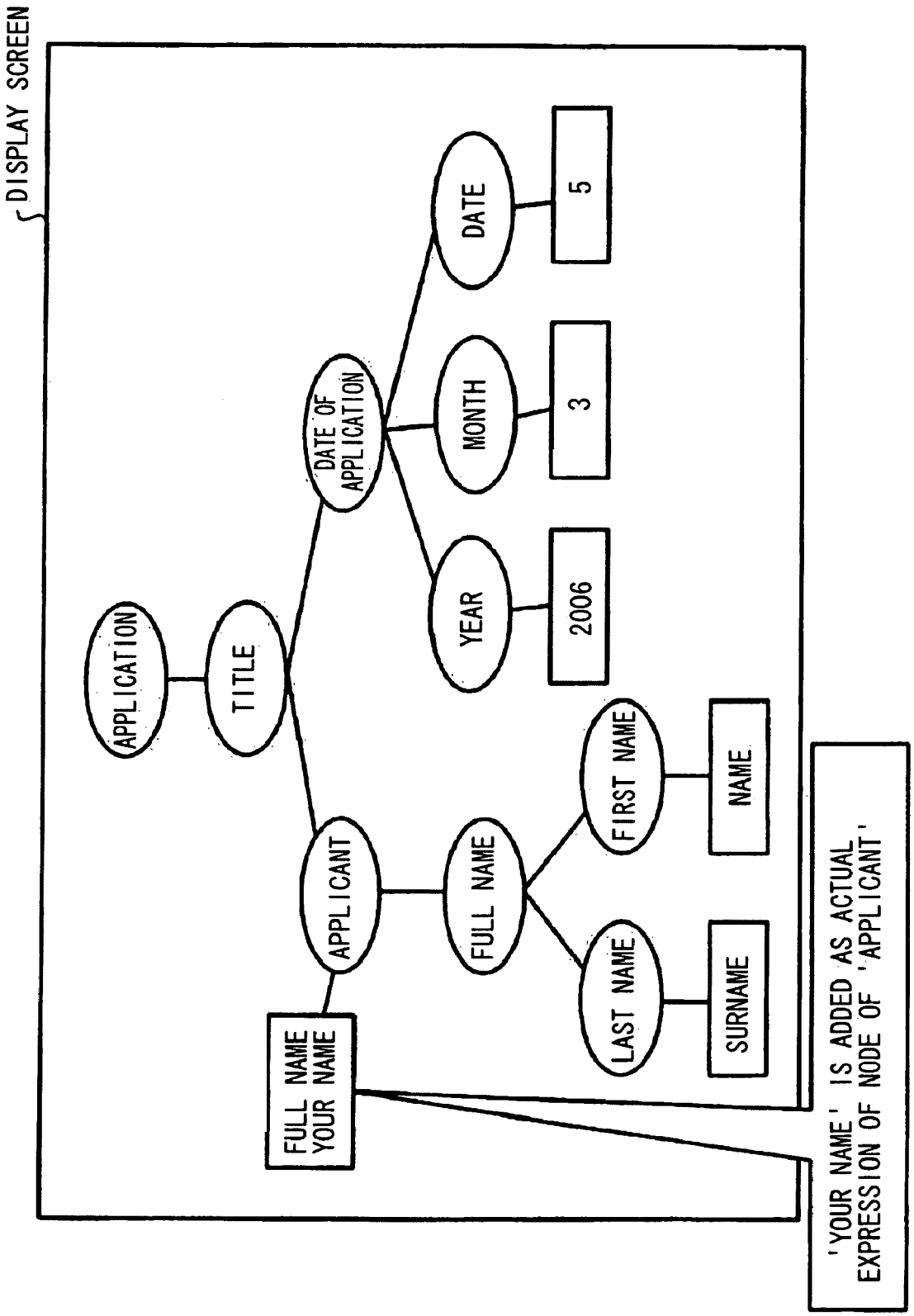

RECORDING MEDIUM FOR RECORDING LOGICAL STRUCTURE MODEL CREATION ASSISTANCE PROGRAM, LOGICAL STRUCTURE MODEL CREATION ASSISTANCE DEVICE AND LOGICAL STRUCTURE MODEL CREATION ASSISTANCE METHOD

CROSS-REFERENCE TO RELATED APPLICATIONS

This application claims the benefit of priority from Japanese Patent Application No. 2007-316318 filed on Dec. 6, 2007, which is herein incorporated by reference in its entirety.

DESCRIPTION OF RELATED ART

In recent years, with computerization in business, many computerized documents are used. Therefore, importance of an image recognition technique, such as an optical character reader or an optical character recognition (OCR), has been increased as a technique for converting paper documents into computerized documents.

An approach is disclosed in Japanese Patent Laid-Open No. 2006-134106, in which the relationship between 'headings' of data, which are desired to be extracted by image recognition from a paper document in which data is entered according to a predetermined format, and 'data', and the relationship among 'headings' are recorded in a 'logical structure model' in advance as a 'logical structure', and data associated with a 'heading' is efficiently extracted accurately.

For example, if a document is an 'application', the relationship that 'headings' such as 'object', 'full name' and 'date of application' will be included is registered in advance with a 'logical structure model'. If these character strings can be found in an OCR-recognized document, from which document type the document is can be specified. At that time, in addition to the relationship of the 'logical structure', its positional relationship is also used. In the above publication, an approach is disclosed in which by using the 'logical structure model', data is extracted from a paper document by image recognition.

However, even in documents having the same object, different words, which represent the same concept, are sometimes used. For example, for 'full name', different expressions, such as 'name', 'first name and last name', 'your name' and 'your full name', are sometimes used. These represent 'the name of the person to fill in the document', and data to be extracted is of the same type.

Therefore, in paper documents having different formats, by grouping words representing the same concept and registering actual expressions while, at the same time, using a logical structure defined by concepts and not concrete words as a 'general logical structure model', not only paper documents having specific formats, but also unknown documents can be handled. However, in order to create the 'general logical structure model', it is necessary to extract concepts common to documents, which have several formats, and register the concrete relationships and expressions. It may be difficult to register all the headings in various formats of documents; even in documents having the same format, whether or not a 'heading' serving as an object exists in the existing 'general logical structure model' must be checked, and further as an element of which concept the registration should be be considered. Further, there is a problem that as registered words are increased, it becomes hard to understand its structure, except for the creator of the 'general logical structure model'.

SUMMARY

At least one embodiment of the present invention provides a logical structure model creation assistance method for assisting in the creation of a logical structure model, which stores, from an image in which character strings associated respectively with a plurality of logical elements constituting a logical structure are described, the logical elements, character strings associated with the logical elements, and the logical structure, wherein character strings in an input image and the logical structure among the character strings in the input image are extracted based on a result of recognition of the input image, a logical element is selected among the plurality of logical elements according to the degrees of similarity between the extracted character strings in the input image and the character string associated respectively with the plurality of logical elements stored in the logical structure model, a character string associated with the selected logical element and a character string in the input image associated with the logical element based on the logical structure among the extracted character strings in the input image are extracted, and the extracted character string is displayed as a candidate update target for the character string associated with the selected logical element.

It is to be understood that both the foregoing summary description and the following detailed description are exemplary and explanatory only and are not restrictive of the present invention as claimed.

BRIEF DESCRIPTION OF THE DRAWINGS

Embodiments are illustrated by way of example and not limited by the following figures.

FIG. 3 is a diagram illustrating an example of an expression of a general logical structure model according to an example embodiment of the present invention;

FIG. 9 is a logical node structural diagram illustrating an overview of a method for estimating a similar logical structure according to an example embodiment of the present invention;

FIG. 10B is a diagram illustrating an example of a display screen in which the actual expression has been added to the node according to an example embodiment of the present invention;

DETAILED DESCRIPTION OF EXAMPLE EMBODIMENTS

Figure 1:
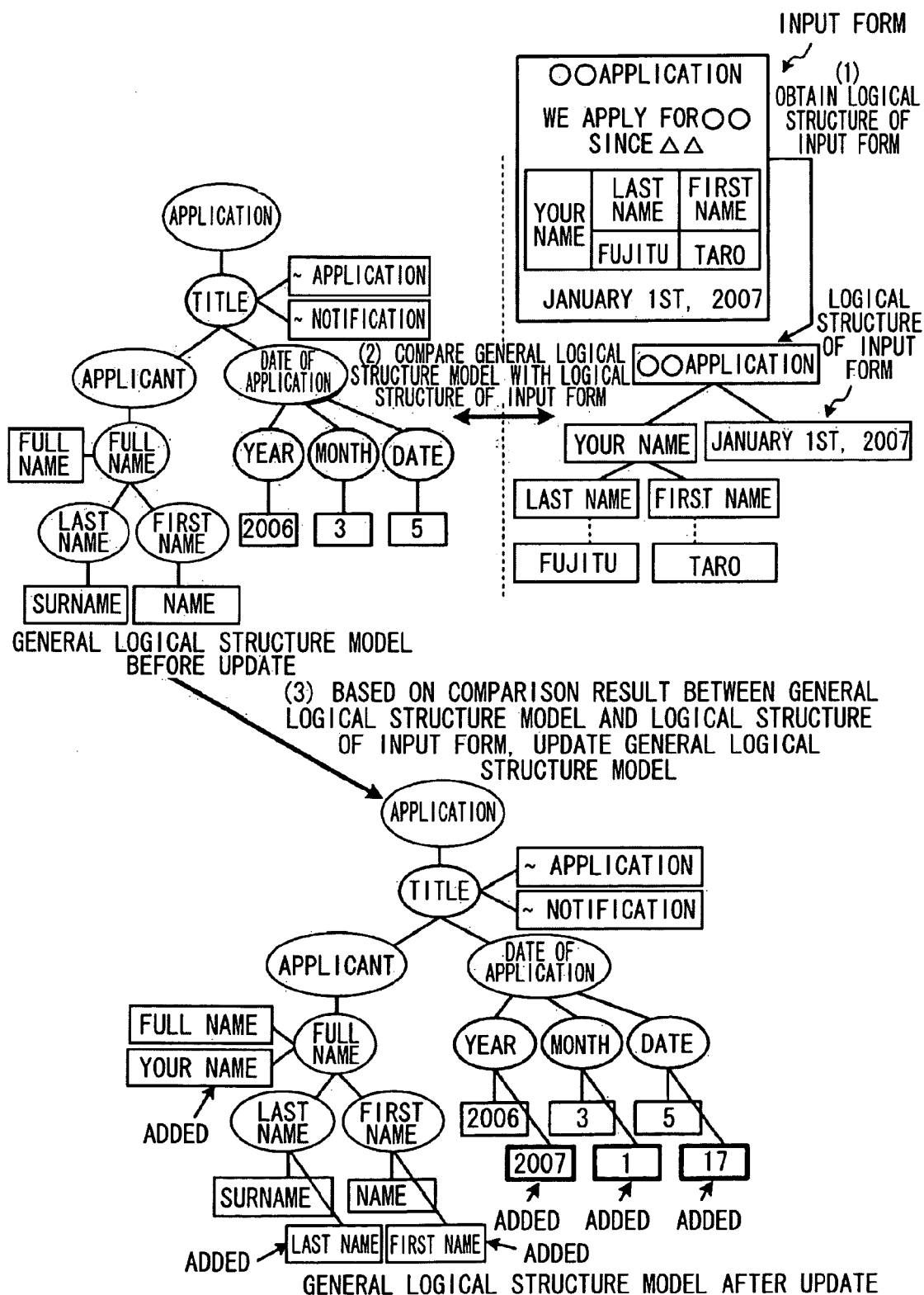
FIG. 1 is a diagram illustrating an a logical node structure according to an example embodiment of the present invention.

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element between the two elements, or one or more intervening elements may also be present. Like reference numerals refer to like elements throughout.

Example embodiments of a logical structure model creation assistance program, a logical structure model creation assistance device and a logical structure model creation assistance method will be described in details below with reference to the accompanying drawings. Note that, in the following example embodiments, an image which is image-recognized, and from which a logical structure model is created, represents an image in which character strings are described as a plurality of logical elements constituting a logical structure, and is a 'form', for example. However, the image is not limited to a 'form', as long as it is an image in which each character strings is described as a plurality of logical elements constituting a logical structure. Here, it is to be understood that the root term "constitute" and its variants are open not closed expressions and should be understood as meaning "comprise" and its variants, respectively.

In addition, in the following example embodiments, a logical structure model, which is created and updated by the logical structure model creation assistance program, the logical structure model creation assistance device and the logical structure model creation assistance method, is a 'general logical structure model' that is a logical structure model common to several types of forms.

In particular, in the following example embodiments, for simplification of description, the 'general logical structure model' is directed to a form having several different types of formats coming under the category of an 'application'. In general, if forms are of the same category, although there are differences more or less in the layouts and items, the included items and the relationship among items are often almost the same. Therefore, for each category of form, which is estimated from the 'headings' obtained from a form, the 'general logical structure model' is switched before use.

However, if a 'general logical structure model' is prepared for each category of form, there is a demerit that puts pressure on database resources. Therefore, a 'general logical structure model' common to all forms may be prepared. This allows the pressure on the database resources due to preparation of a 'general logical structure model' for each form to be reduced if not prevented, and the 'general logical structure model' to be managed more efficiently.

FIG. 1 is a diagram illustrating an a logical node structure according to an example embodiment of the present invention. As shown in FIG. 1, (1) first, image recognition is performed on a paper input form, and the logical structure of the input form is obtained. Here, it should be understood that a paper input form is inclusive of printed input forms that appear on media other than paper, e.g., on velum, etc. For the purposes of discussion, FIG. 1 assumes a hypothetical and non-limiting input form called out in FIG. 1 with the label "INPUT FORM".

According to FIG. 1, in the logical structure obtained from the input form, a node associated with the 'heading' labeled "◯◯application" serves as the root node, in the lower levels therefrom, nodes associated with the 'heading' labeled "your name" and the 'heading' labeled "Jan. 1, 2007" are present.

Further, in the lower levels from the node associated with the 'heading' labeled "your name", nodes associated with the 'headings' labeled "last name" and "first name" are present. Data "Fujitu" is associated with the "last name", and data "Taro" is associated with the "first name", respectively.

(2) Next, a 'general logical structure model' before update, which is prepared in advance, is compared with the logical structure of the input form obtained in (1). In the 'general logical structure model', nodes represented with ellipses are abstract logical elements, and are given designations. Further, elements associated with each of the logical elements, and represented with rectangles are actual data associated with the logical elements (hereinafter, referred to as 'actual expression'. The relationship among each of logical elements constitutes the logical structure of the 'general logical structure model'.

For example, "~application" and "~notification" are associated with a logical element "title" as 'actual expressions'. Since the 'actual expression' labeled "~application" is similar to "xx application", which is the root node of the input form, it can be assumed that a logical structure similar to the logical structure obtained from the input form is present at a lower level from the logical element "title".

Thus, when the levels below the logical element "title" are followed, a logical element having a designation "full name" is present. This "full name", which is the designation of the logical element, is similar to the 'heading' labeled "your name" in the logical structure of the input form. However, only the 'actual expression', "full name" is associated with the logical element "full name" and no 'actual expression' identical to the 'heading', "your name" in the logical structure of the input form is registered.

Further, when the levels below the logical element "full name" are followed, logical elements "last name" and "first name" are present, which match the 'headings', "last name" and "first name" in the logical structure of the input form. However, only the 'actual expressions', "surname" and "first name" are associated with the logical elements "last name" and "first name", respectively and no 'actual expression' identical to the 'headings', "last name" and "first name" in the logical structure of the input form is registered. Similarly, when the other levels below the logical element "title" are followed, a logical element having a designation "date of application" is present. It can be assumed that this "date of application", which is the designation of the logical element, is similar to the 'heading' labeled "Jan. 1, 2007" in the logical structure of the input form.

Further, when the levels below the logical element "date of application" are followed, it can be seen that logical elements "year", "month" and "data" are present. Only "2006", "3" and "5" are associated with the 'actual expression' of each of the logical elements. Since when "Jan. 1, 2007" in the logical structure of the input form is analyzed, "Jan. 1, 2007" can be broken down into "2007", "year", "1", "month", "1" and "date", it can be seen that "2007", "1" and "1" may be the 'actual expressions' of the logical elements "year", "month" and "date", respectively. "2007", "1" and "1" have not been registered as the 'actual expressions' of the logical elements "year", "month" and "date".

As described above, although some among the 'headings' in the logical structure of the input form correspond to logical elements of the 'general logical structure model', if they are not registered as logical element designations or 'actual expressions', it may be difficult for the image recognition of the input form to be performed correctly using this 'general logical structure model'; therefore, the 'headings' have to be registered as 'actual expressions' of the 'general logical structure model'.

(3) Thus, in order to resolve this disadvantage, a logical structure model creation assistance program, a logical structure model creation assistance device, and a logical structure model creation assistance method are developed, for assisting in an operation for adding a 'heading' obtained from an input form as an 'actual expression' of a corresponding logical element in a 'general logical structure model'.

As shown in (3), added respectively in the 'general logical structure model' are, "your name" as an 'actual expression' of the logical element "full name", "last name" as an 'actual expression' of the logical element "last name", "first name" as an 'actual expression' of the logical element "first name", "2007" as an 'actual expression' of the logical element "year", "1" as an 'actual expression' of the logical element "month", and "1" as an 'actual expression' of the logical element "date".

In the related art, the operations of extracting from the 'general logical structure model' a logical structure that matched the logical structure of the input form and adding an 'actual expression' to an appropriate logical element became more difficult operations as the logical structure of the 'general logical structure model' became more complex. By contrast, embodiments of the present invention that correspond to FIG. 1 facilitate reduction in the difficulty despite an increasing complexity of a 'general logical structure model,' and facilitate making it easier for someone in addition to the designer, author, and manager of the 'general logical structure model' to add an 'actual expression' to an appropriate logical element in the 'general logical structure model' based on the input form.

Figure 2:
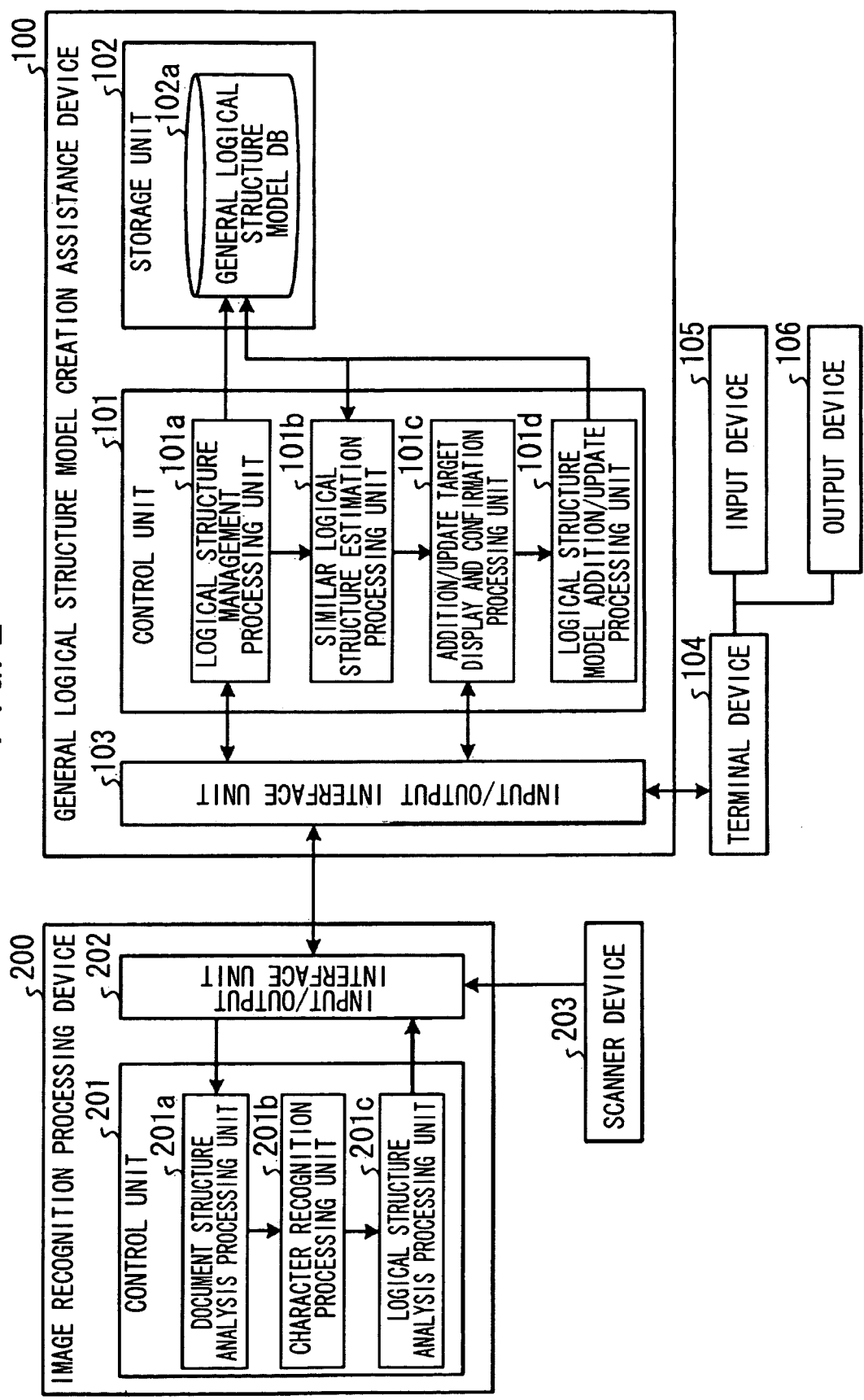
FIG. 2 is a functional block diagram illustrating the structure of a general logical structure model creation assistance device according to an example embodiment of the present invention.

FIG. 2 is a functional block diagram illustrating the structure of a general logical structure model creation assistance device 100 according to an embodiment of the present invention. FIG. 2 may be compatible with the logical node structure of FIG. 1. As shown in FIG. 2, the general logical structure model creation assistance device 100 is connected to an image recognition processing device 200.

The general logical structure model creation assistance device 100 is connected to a terminal device 104, which receives from an input device 105, e.g., a keyboard, a mouse, etc., an operating instruction to create or update a general logical structure model, and to which an output device 106 is connected, e.g., a display for displaying the general logical structure model to be created or updated.

The image recognition processing device 200 has a control unit 201 and an input/output interface unit 202, which is an interface for communicating with the general logical structure model creation assistance device 100 and a scanner device 203. The control unit 201 in the image recognition processing device 200 has a document structure analysis processing unit 201*a* for analyzing the document structure of an input form, a character recognition processing unit 201*b* for recognizing a character written in the input form and a logical structure analysis processing unit 201*c* for analyzing the logical structure of the input form, and sending the logical structure to the general logical structure model creation assistance device 100. In addition, the image recognition processing device 200 is connected to the scanner device 203 for reading forms.

The general logical structure model creation assistance device 100 has a control unit 101, a storage unit 102 and an input/output interface unit 103, which is an interface for communicating with the image recognition processing device 200 and the terminal device 104.

The control unit 101 is a control device, e.g., a microcomputer, which may take control of the entire general logical structure model creation assistance device 100 and may have a logical structure management processing unit 101*a*, a similar logical structure estimation processing unit 101*b*, an addition/update target display and confirmation processing unit 101*c* and a logical structure model addition/update processing unit 101*d*.

The logical structure management processing unit 101*a* is a processing unit for managing general logical structure models stored in a general logical structure model DB (database) 102*a* described later, and managing 'headings' in the input form and the logical structure of the 'headings' received from the image recognition processing device 200. More specifically, the form read instruction from a user received from the input device 105 serving as the trigger, the logical structure management processing unit 101*a* instructs the image recognition processing device 200 to read and input the form by the scanner device 203, analyze the document structure of the input form, recognize characters in the input form and analyze the logical structure of the input form. Further, the logical structure management processing unit 101*a* receives the logical structure of the analyzed input form from the image recognition processing device 200, and passes it to the similar logical structure estimation processing unit 101*b*.

In addition, when no 'general logical structure model' having a logical structure similar to the 'headings' and the logical structure of the 'headings' in the input form received from the image recognition processing device 200 is registered with the general logical structure model DB 102*a* described later, the logical structure management processing unit 101*a* creates a new 'general logical structure model' corresponding to the 'headings' in the input form and the logical structure of the 'headings'.

The similar logical structure estimation processing unit 101*b* compares the logical structure of the 'general logical structure model' stored in the general logical structure model DB 102*a* described later with the logical structure of the input form received from the logical structure management processing unit 101*a*.

More specifically, starting from the 'heading' of the root node in the logical structure of the input form, the similar logical structure estimation processing unit 101*b* searches the general logical structure model DB 102*a* described later, in order to examine whether or not the designation of a logical element similar to each 'heading', or the 'actual expression' of the logical element similar to the 'heading' has been registered with the 'general logical structure model'. Further, the similar logical structure estimation processing unit 101*b* determines whether or not the logical structure of 'headings' of the similar input form and the logical structure of the logical elements associated with the 'actual expressions' of the 'general logical structure model' are similar. In this manner, the similar logical structure estimation processing unit 101*b* estimates portions similar to the logical structure of the input form in the logical structure of the 'general logical structure model'.

The addition/update target display and confirmation processing unit 101*c* causes the output device 106 to display a portion in the logical structure of the 'general logical structure model', which was estimated to be similar to the logical structure of the input form by the similar logical structure estimation processing unit 101*b*, and a display screen to prompt the user to confirm, in order to add the 'heading' in the input form to the 'actual expression' of each logical element in the logical structure.

More specifically, the 'actual expression' of the logical element of a portion in the logical structure of the 'general logical structure model', which was estimated to be similar to the logical structure of the input form by the similar logical structure estimation processing unit 101*b*, and the 'heading' in the input form, which was estimated to be associated with the logical element are extracted together and listed to inquire the user via a graphical user interface (GUI) whether or not the 'actual expression' of the logical element in the 'general logical structure model' may be updated according to the contents of the list. The user confirms the display contents on the GUI, and inputs through the input device 105 an instruction as to whether or not the 'actual expression' of the logical element in the 'general logical structure model' is updated.

When receiving the instruction to update the 'actual expression' of the logical element in the 'general logical structure model' from the user, the addition/update target display and confirmation processing unit 101*c* performs on the logical structure model addition/update processing unit 101*d*, update of the 'actual expression' of the logical element in the 'general logical structure model' stored in the general logical structure model DB 102*a*.

Note that when the inquiry is made to the user as to whether or not the 'actual expression' of the logical element in the 'general logical structure model' may be updated according to the contents in which the 'actual expression' of the logical element of a portion in the logical structure of the 'general logical structure model', which was estimated to be similar to the logical structure of the input form by the similar logical structure estimation processing unit 101*b*, and the 'heading' in the input form, which was estimated to be associated with the logical element, are extracted together and listed, if the position of the logical element in the 'general logical structure model' where the 'heading' in the input form is to be added is inappropriate, the user uses the input device 105 such as a mouse to drag and drop the 'heading' to an appropriate logical element, thus giving an instruction to modify the position where the 'heading' is to be added.

The storage unit 102 is a memory, which can store the DB, and includes a general logical structure model DB 102*a*. The general logical structure model DB 102*a* is a DB storing a 'general logical structure model'. The 'general logical structure model' may have a hierarchical structure, e.g., a tree structure. Hence, data may be managed in, e.g., an extensible markup language (XML) format as shown in FIG. 3.

FIG. 3 is a diagram illustrating an example of an expression of the general logical structure model, according to an example embodiment of the present invention, as expressed in the XML format. In FIG. 3, a "class" in XML corresponds to a logical element in the 'general logical structure model'. A "class name" is the designation of a logical element. Further, the character string written between "instance type="~"" and "/instance" is an "instance", which is a concrete realization name for the abstract concept "class". Note that the "instance type" specifies the attribute of the "instance", which is a concrete realization name for the "class". Since a character string outside the attribute specification cannot be registered as an "instance", comparison of the designation or 'realization value' of the logical element in the general logical model with the 'heading' in the input form is not needed.

Figure 4:
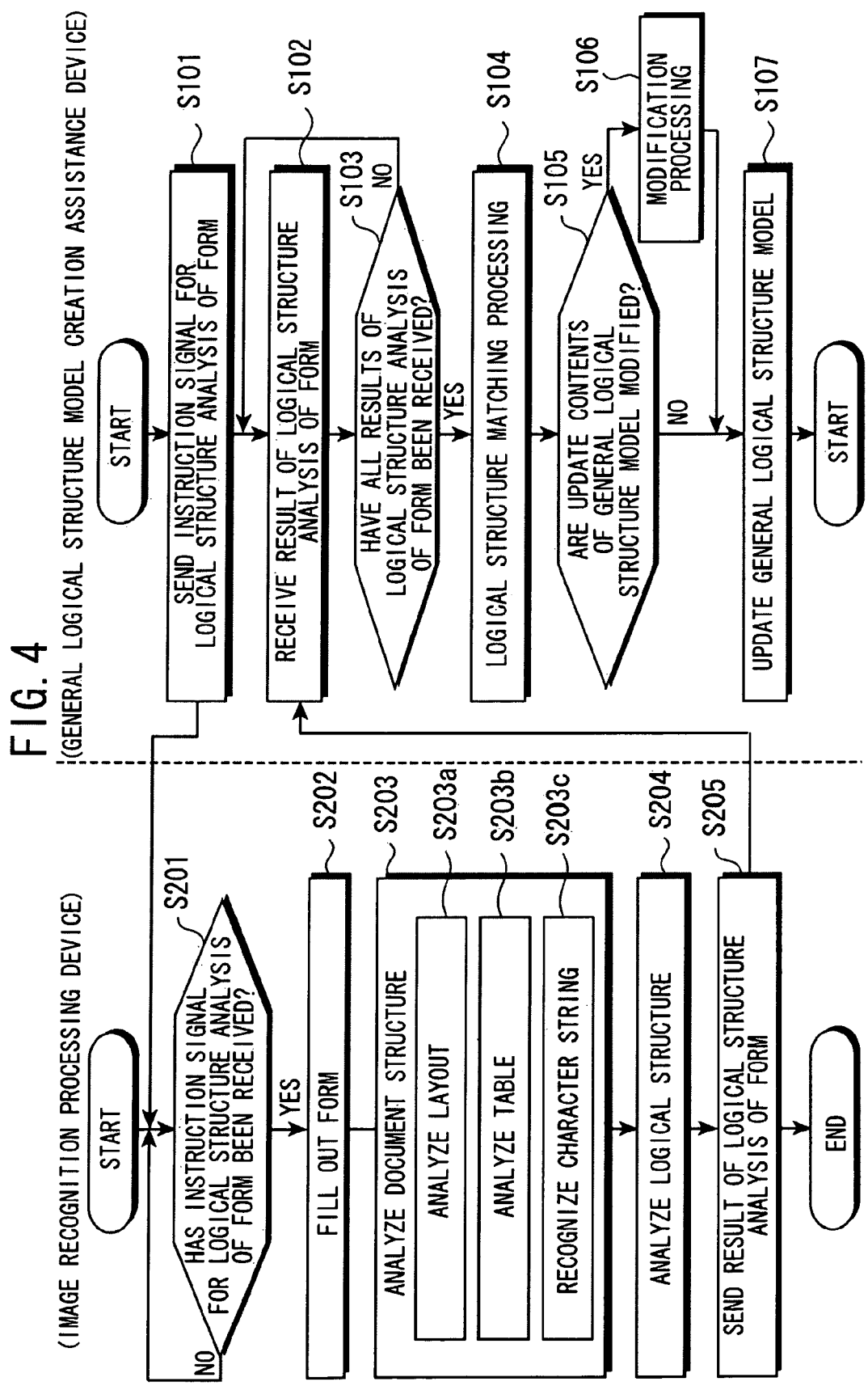
FIG. 4 is a flow chart illustrating a general logical structure model update processing procedure according to an example embodiment of the present invention.

FIG. 4 is a flow chart illustrating a general logical structure model update processing procedure according to an example embodiment of the present invention. First, the logical structure management processing unit 101*a* in the general logical structure model creation assistance device 100 sends an instruction signal for logical structure analysis of form to the image recognition processing device 200 (step S101).

When the document structure analysis processing unit 201*a* in the image recognition processing device 200 receives the instruction signal for logical structure analysis of form from the logical structure management processing unit 101*a* in the general logical structure model creation assistance device 100 (step S201 positive), the process goes to step S202, on the other hand, when it does not receive the instruction signal for logical structure analysis of form (step S201 negative), step S201 is repeated.

In step S202, the document structure analysis processing unit 201*a* in the image recognition processing device 200 receives the input of a form through the scanner device 203. Subsequently, the document structure analysis processing unit 201*a* and the character recognition processing unit 201*b* perform document analysis (step S203). More specifically, in step S203, the document structure analysis processing unit 201*a* analyzes the layout of the input form (step S203*a*) and a table (step S203*b*), and the character recognition processing unit 201*b* recognizes character strings in the input form (step S203*c*).

Namely, document structure analysis processing, e.g., layout analysis and table analysis, is performed on the input form entered into the image recognition processing device 200 by the scanner device 203, and regions, e.g., a table and a figure, and cell positions in the table are extracted. Thereafter, character string information is extracted by character recognition processing.

Note that morpheme analysis processing is performed during character recognition processing, and a character string is broken down into word level and basic block level. For example, a word 'onamae (name)' is broken down into 'o (prefix)' and 'namae (name)', and compared with the name of logical elements and actual expressions in the 'general logical structure model', respectively.

Subsequently, the logical structure analysis processing unit 201c in the image recognition processing device 200 uses the above layout analysis result and character recognition result, and utilizes cells in the table and the positional relationship among character strings to estimate the logical structure (step S204). By performing layout analysis and table structure analysis on the input form, the structure of nodes and concrete data ('heading') of each node can be grasped. Further, by utilizing the layout information, the logical structure of the input form can be estimated. Such processing may be performed using existing techniques.

Subsequently, the logical structure analysis processing unit 201c in the image recognition processing device 200 sends the analysis result of the logical structure of the input form in step S204 to the general logical structure model creation assistance device 100 (step S205).

Meanwhile, the logical structure management processing unit 101a in the general logical structure model creation assistance device 100 receives the result of logical structure analysis of form from the image recognition processing device 200 (step S102). Then, the logical structure management processing unit 101a determines whether or not all the results of logical structure analysis of form have been received (step S103). When it is determined that all the results of logical structure analysis of form have been received (step S103 positive), the process goes to step S104, on the other hand, when it is not determined that all the results of logical structure analysis of form have been received (step S103 negative), the process goes to step S102.

Figure 6:
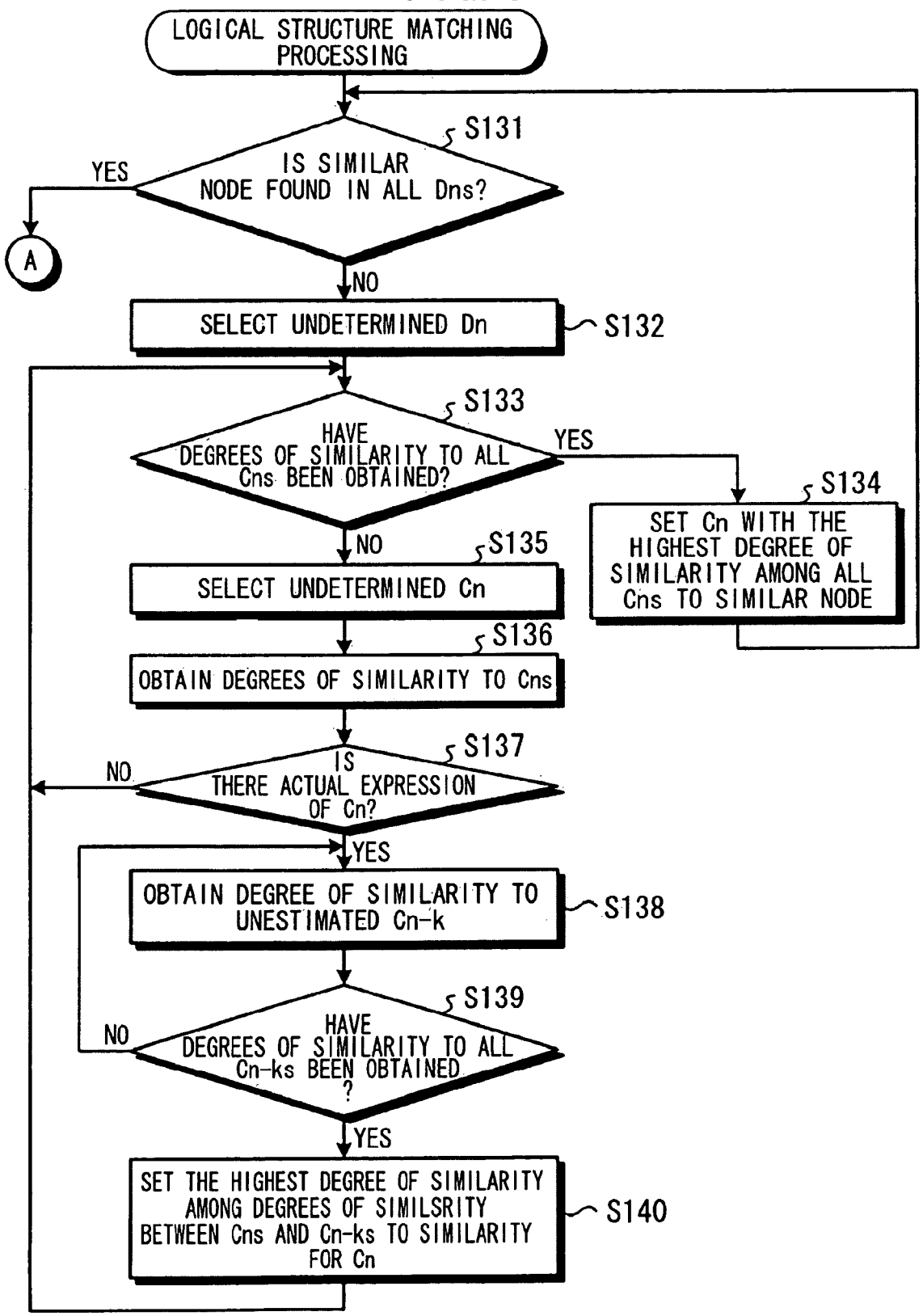
FIGS. 6~7 are flow charts illustrating a logical structure matching processing procedure according to an example embodiment of the present invention.

Subsequently, in step S104, the similar logical structure estimation processing unit 101b in the general logical structure model creation assistance device 100 performs logical structure matching processing of the result of logical structure analysis of form received in step S102 with the 'general logical structure model' stored in the general logical structure model DB 102a (logical structure matching processing; see, e.g., the discussion below of FIG. 6). With this processing, a portion where the logical structure of the input form based on the result of logical structure analysis of form received in step S102 matches the logical structure of the 'general logical structure model' can be grasped, thus a portion where the 'heading' of the node in the logical structure of the corresponding input form is to be added to the 'actual expression' in the 'general logical structure model' can be found.

Subsequently, the addition/update target display and confirmation processing unit 101c in the general logical structure model creation assistance device 100 causes the output device 106 to display a confirmation display to the user, and, based on the result of response input, determines whether or not update contents for adding the 'heading' of the node in the logical structure of the corresponding input form to an 'actual expression' in the 'general logical structure model' and updating the 'actual expression' are modified (step S105).

That is to say, when it is determined that the update contents for updating the 'actual expression' in the 'general logical structure model' are modified (step S105 positive), the process goes to step S106, on the other hand, when it is not determined that the update contents for updating the 'actual expression' in the 'general logical structure model' are modified (step S105 negative), the process goes to step S107.

In step S106, the addition/update target display and confirmation processing unit 101c in the general logical structure model creation assistance device 100 receives the modification of the update contents for updating the 'actual expression' in the 'general logical structure model' by the user, and modifies the update contents. When this processing is finished, the process goes to step S107.

In step S107, the 'actual expression' in the 'general logical structure model' is updated according to the update contents for updating the 'actual expression' in the 'general logical structure model', which was not determined to be modified in step S105, or the update contents for updating the 'actual expression' in the 'general logical structure model' modified in step S106.

Figure 5:
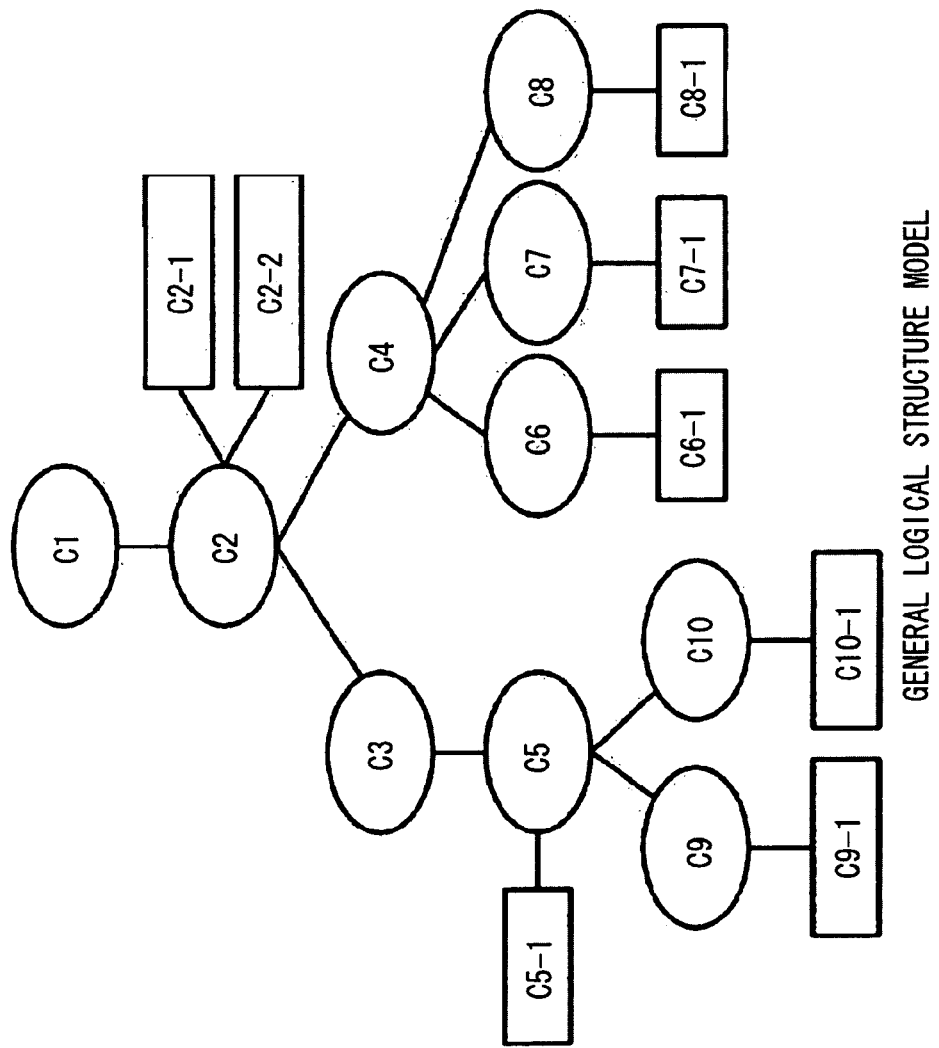
FIG. 5 is a logical node structural diagram illustrating an example of the abstract expression between the general logical structure model and a logical structure obtained from an input form according to an example embodiment of the present invention.

Next, before the detail description of the logical structure matching processing in step S104 of FIG. 4, an abstract expression between the 'general logical structure model' and the logical structure obtained from the input form will be described. The logical structure matching processing is described based on the abstract expression. FIG. 5 is a logical node structural diagram illustrating an example of the abstract expression between the general logical structure model and a logical structure obtained from an input form.

The abstract expression of the general logical structure model will be first described with reference to the left side of FIG. 5. In FIG. 5, "Cns" (n=1, 2, 3, . . . , 8, 9, 10) surrounded by ellipses are logical elements constituting the 'general logical structure model'. The "Cns" are designations of the logical elements. Character strings surrounded by rectangles respectively associated with the logical elements (e.g., "C2-1" and "C2-2" associated with the logical element "C2") are 'actual expressions' of the logical elements. Hereinafter, an 'actual expression' is abstractly expressed as "Cn-k".

Then, each logical element "Cn" constitutes a hierarchical structure in which "Cns" are associated with each other by solid lines as shown. Although not shown in the figure, note that each logical element "Cn" may be set to a respective attribute value "Cn-T" as a desired value for the attribute of a character string of an 'actual expression' that can be associated. This attribute value "Cn-T" allows a character string that cannot be clearly associated with a logical element "Cn" to be eliminated in advance from addition candidates to the 'actual expression' based on the attribute value of a character string.

Next, the abstract expression of the logical structure obtained from the input form will be described with reference to the right side of FIG. 5. In FIG. 5, strings "Dns" (n=1, 2, 3, 4, 5) surrounded by rectangles are 'headings' constituting the logical structure obtained from the input form. Each 'heading', "Dn" constitutes a hierarchical structure in which "Dns" are associated with each other by solid lines as shown. Further, "D6" and "D7", which are 'headings', and each of which is associated with "D4" and "D5" by a dashed line, and surrounded by a rectangle, are the 'heading' of each of "D4" and "D5".

Note that the relationship in the logical structure may have, supposing a tree structure, parent nodes and children nodes, or may be represented as an adjacency matrix of a general graph. However, in order to clarify the up-down relationship of levels as a tree, for example, numbers are always set to be greater for the children nodes.

Figure 7:
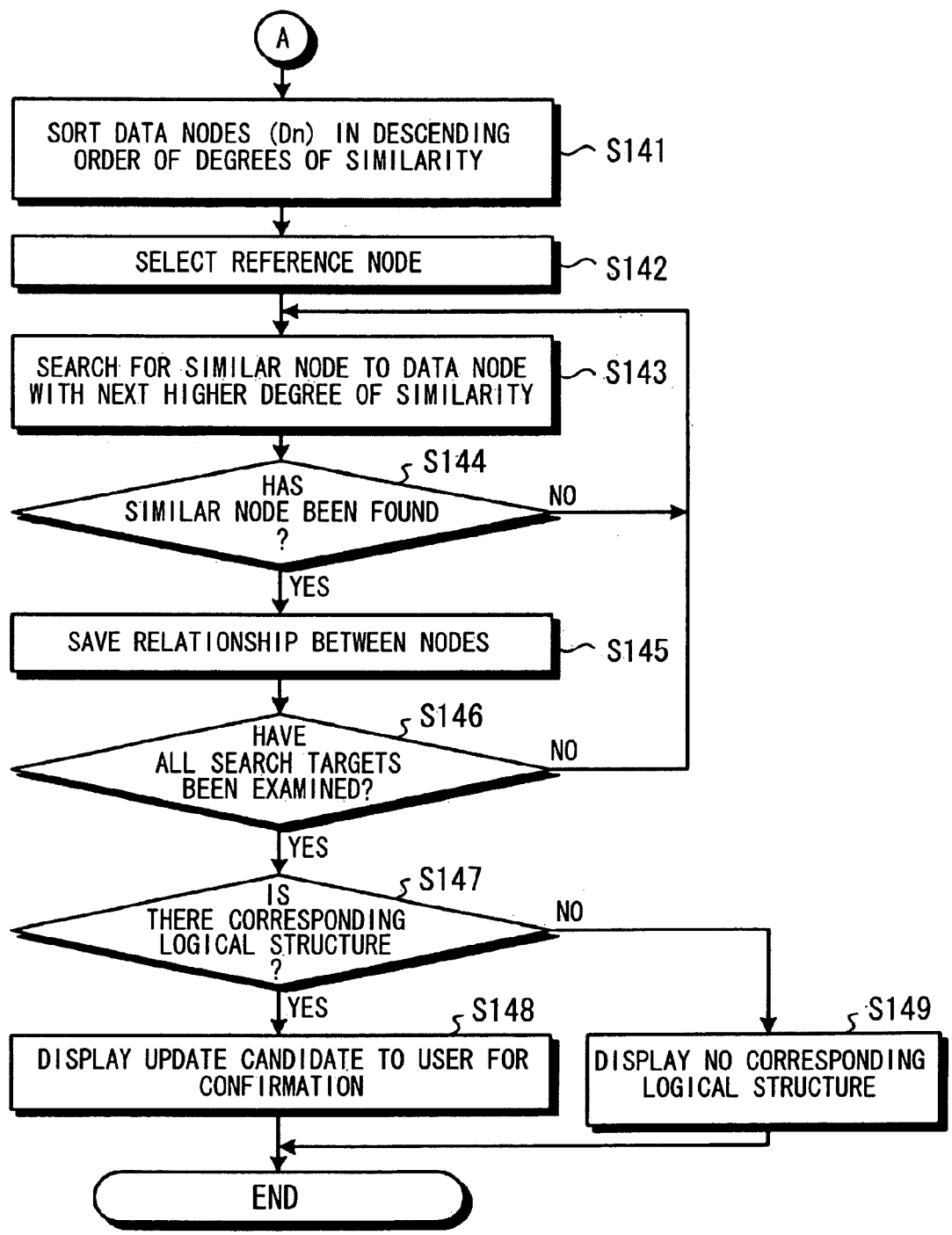

Based on the understanding above, the details of the logical structure matching processing in step S104 of FIG. 4 will be described. FIGS. 6 and 7 are flow charts illustrating a logical structure matching processing procedure according to an example embodiment of the present invention. As shown in FIGS. 6 and 7, the similar logical structure estimation processing unit 101b in the general logical structure model creation assistance device 100 first determines whether or not a similar node (logical element) has been found in the 'general logical structure model' in all "Dns" (n=1, 2, 3, 4, 5) (step S131). Here, the similar node to "Dn" represents a logical element whose designation or 'actual expression' is similar to the "Dn" in the 'general logical structure model'.

When it is determined that a similar node (logical element) has been found in the 'general logical structure model' in all "Dns" (n=1, 2, 3, 4, 5) (step S131 positive), the process goes to step S141 of FIG. 7. When it is not determined that a similar node (logical element) has been found in the 'general logical structure model' in all "Dns" (n=1, 2, 3, 4, 5) (step S131 positive), the process goes to step S132.

In step S132, the similar logical structure estimation processing unit 101b selects "Dn" whose similar node has not been determined yet. Then, the similar logical structure estimation processing unit 101b determines whether or not the degrees of similarity between "Dn" selected in step S132 and all "Cns" have been obtained (step S133). Here, the degree of similarity is obtained with a Levenshtein distance, for example, and the smaller the Levenshtein distance, the more similar. Note that in addition to the Levenshtein distance, any indicator is adequate, such as inter-character correlation coefficient, as long as it indicates the degree of similarity of a character string (or a character).

When it is determined that the degrees of similarity between the "Dn" selected in step S132 and all "Cns" have been obtained (step S133 positive), the process goes to step S134, on the other hand, when it is not determined that the degrees of similarity between "Dn" selected in step S132 and all "Cns" have been obtained (step S133 negative), the process goes to step S135.

In step S134, for each "Dn" selected in step S132, the similar logical structure estimation processing unit 101b sets the "Cn" with the highest degree of similarity to a similar node. When this processing is finished, the process goes to step S131.

Meanwhile, in step S135, the similar logical structure estimation processing unit 101b selects "Cn" whose degree of similarity to "Dn" selected in step S132 has not been obtained yet. Subsequently, the similar logical structure estimation processing unit 101b obtains the degree of similarity between "Dn" selected in step S132 and "Cn" selected in step S135 (step S136).

Subsequently, the similar logical structure estimation processing unit 101b determines whether or not the 'actual expression' has been associated with "Cn" selected in step S135 (step S137). When it is determined that the 'actual expression' has been associated with "Cn" selected in step S135 (step S137 positive), the process goes to step S138, on the other hand, when it is not determined that the 'actual expression' has been associated with "Cn" selected in step S135 (step S137 negative), the process goes to step S133.

In step S138, the similar logical structure estimation processing unit 101b obtains the degree of similarity between "Dn" selected in step S132 and "Cn-k" whose degree of similarity has not been obtained yet, among "Cn-ks", which are the 'actual expressions' associated with "Cn" selected in step S135.

Subsequently, the similar logical structure estimation processing unit 101b determines whether or not the degrees of similarity to all "Cn-ks" associated with "Cn" selected in step S135 have been obtained (step S139). When it is determined that the degrees of similarity to all "Cn-ks" associated with "Cn" selected in step S135 have been obtained (step S139 positive), the process goes to step S140, on the other hand, when it is not determined that the degrees of similarity to all "Cn-ks" associated with "Cn" selected in step S135 have been obtained (step S139 negative), the process goes to step S138.

In step S140, the similar logical structure estimation processing unit 101b sets to the degree of similarity of "Cn" the highest degree of similarity among degrees of similarity between "Dn" selected in step S132, and "Cn" selected in step S135 and all the "Cn-ks" associated with this "Cn". When this processing is finished, the process goes to step S133.

Meanwhile, in step S141, the similar logical structure estimation processing unit 101b sorts the nodes "Dn" of 'headings', in descending order of the degrees of similarity. Subsequently, the similar logical structure estimation processing unit 101b selects, as a 'reference node', the node "Dn" of the 'heading' with the highest degree of similarity, and the logical element in the 'general logical structure model' corresponding to the "Dn" (step S142).

In addition, the similar logical structure estimation processing unit 101b pre-limits the search range for searching the 'general logical structure model' for the similar node to the "Dn" down to a desired order (for example, fourth position) among the nodes "Dns" of the 'headings' sorted in the descending order of the degrees of similarity (setting of the search range), omitting the search for "Dns" with lower degrees of similarity, to reduce the processing time.

Note that the 'reference node' selected in step S141 described above may be arbitrarily selected by the user, or another node may serve as a 'reference node' without using the "Dn" with the highest degree of similarity as a 'reference node'.

Subsequently, the similar logical structure estimation processing unit 101b searches for a similar node (logical element) to the node "Dn" of the 'heading' with the next higher degree of similarity to the 'reference node' in the 'general logical structure model', in order of the lower level, the upper level and the same level from the 'reference node' (step S143). Subsequently, the similar logical structure estimation processing unit 101b determines whether or not the similar node to the node "Dn" of the 'heading' with the next higher degree of similarity to the 'reference node' has been found in the 'general logical structure model' (Step S144).

When it is determined that the similar node to the node "Dn" of the 'heading' with the next higher degree of similarity to the 'reference node' has been found in the 'general logical structure model' (step S144 positive), the process goes to step S145, on the other hand, when it is not determined that the similar node to the node "Dn" of the 'heading' with the next higher degree of similarity to the 'reference node' has been found in the 'general logical structure model' (step S144 negative), the process goes to step S143.

In step S145, the similar logical structure estimation processing unit 101b saves the relationship (logical structure) between nodes of the logical element "Cn", which was a search target the previous time, and the logical element "Cn", which is a search target this time. Subsequently, the similar logical structure estimation processing unit 101b determines whether or not the search for the similar nodes in the 'general logical structure model' has been finished for all the search targets ("Dns" in the search range described above) (step S146).

When it is determined that the search for the similar nodes in the 'general logical structure model' has been finished for all the search targets ("Dns" in the search range described above) (step S146 positive), the process goes to step S147, on the other hand, when it is not determined that the search for the similar nodes in the 'general logical structure model' has been finished for all the search targets (step S146 negative), the process goes to step S143.

In step S147, the similar logical structure estimation processing unit 101b determines whether or not the logical structure corresponding to the logical structure of the input form is present in the 'general logical structure model' based on the relationship among the nodes stored in step S145.

When it is determined that the logical structure corresponding to the logical structure of the input form is present in the 'general logical structure model' (step S147 positive), the process goes to step S148, on the other hand, when it is not determined that the logical structure corresponding to the logical structure of the input form is present in the 'general logical structure model' (step S147 negative), the process goes to step S149.

In step S148, the addition/update target display and confirmation processing unit 101c displays on the output device 106 the update candidate that will be updated by adding an 'actual expression' to a logical element in the 'general logical structure model', together with the logical elements and the logical structure of the 'general logical structure model' for the user to confirm. After the confirmation by the user, the logical structure model addition/update processing unit 101d updates the 'actual expression' of the logical element in the 'general logical structure model' with the above update candidate. When this processing is finished, the process is returned to the general logical structure model update processing in FIG. 4.

Meanwhile, in step S149, the addition/update target display and confirmation processing unit 101c displays a message 'there is no corresponding logical structure' on the output device 106 to the user, and the process is returned to the general logical structure model update processing in FIG. 4.

Note that, after the message 'there is no corresponding logical structure' is displayed on the output device 106 in step S149, without the process returning to the general logical structure model update processing of FIG. 4, the 'reference node' may be changed, or a selection criterion for "Dn" whose similar node is searched for in the 'general logical structure model' next to the 'reference node' may be changed, then the process may go to step S142 again for redoing the process.

Figure 8:
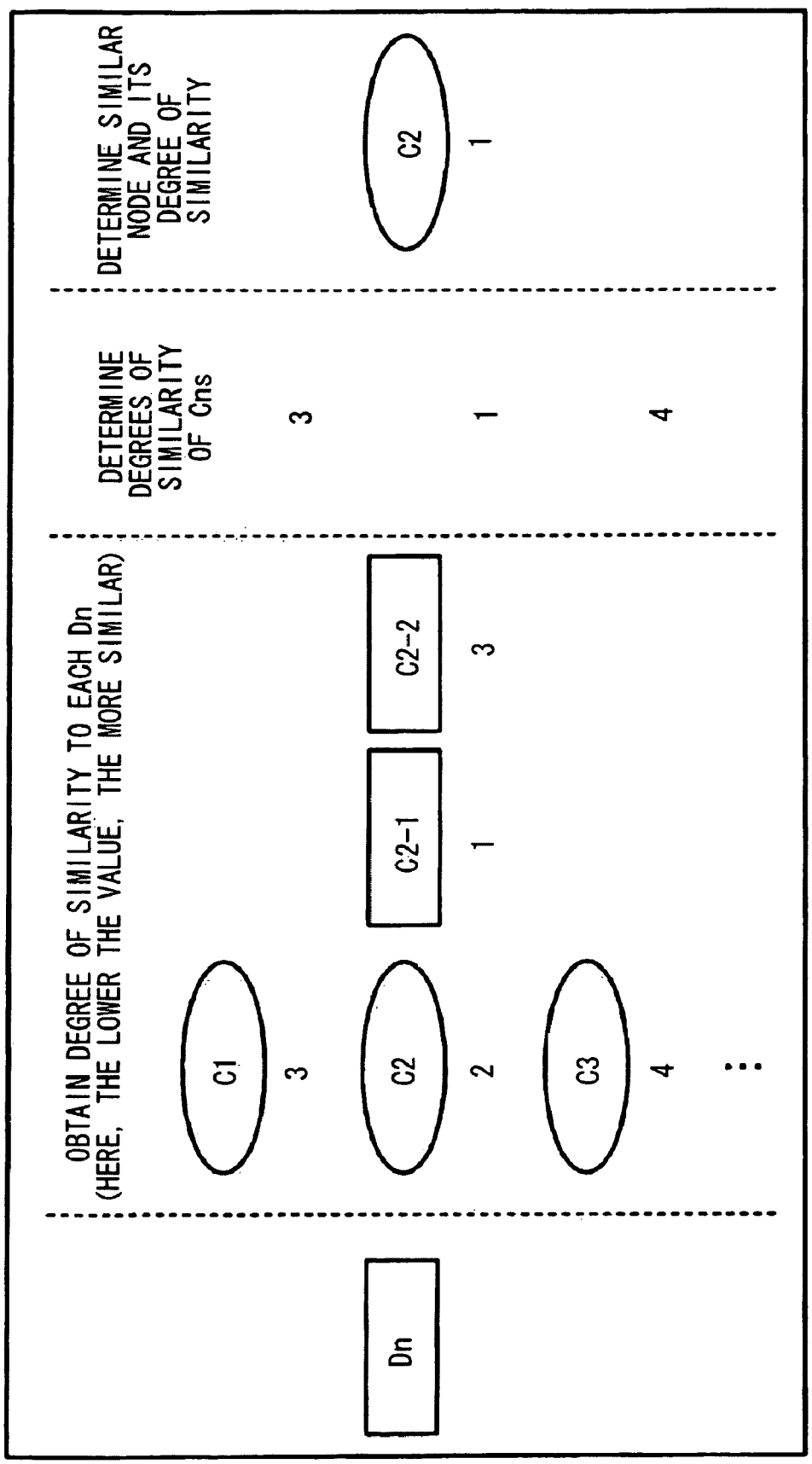
FIG. 8 is a diagram illustrating an overview of a method for determining a similar node according to an example embodiment of the present invention.

Next, an overview of a method for determining a similar node, which is performed in steps S132 to S140 of the logical structure matching processing of FIG. 6, will be described. FIG. 8 is a diagram illustrating an overview of a method for determining a similar node according to an example embodiment of the present invention. As shown in FIG. 8, for one "Dn", which is a 'heading' in the input form, the degrees of similarity to the designations of all the logical elements in the 'general logical structure model' are obtained.

As a result, it is assumed that the degree of similarity between "Dn" and "C1" is "3", the degree of similarity between "Dn" and "C2" is "2", the degree of similarity between "Dn" and "C3" is "4". In addition, since "C2-1" and "C2-2" are associated with "C2" as 'actual expressions', the degrees of similarity between "Dn", and "C2-1" and "C2-2" are also obtained. As a result, it is assumed that the degree of similarity between "Dn" and "C2-1" is "1", and the degree of similarity between "Dn" and "C2-2" is "3".

Here, since when the Levenshtein distance is used as the degree of similarity, the smaller the numerical value, the more similar, the degree of similarity between "Dn" and "C1" is "3", the degree of similarity of "Dn" and "C2" is "1" due to the level of similarity to "C2-1", and the degree of similarity between "Dn" and "C3" is "4". Therefore, finally, it is determined that the similar node to "Dn" is "C2", and its degree of similarity is "1".

Next, the overview of a method for estimating a similar structure, which is performed in steps S141 to S146 of the logical structure matching processing of FIG. 7, will be described. FIG. 9 is a diagram illustrating an overview of a method for estimating a similar logical structure according to an example embodiment of the present invention. As shown in FIG. 9, it is assumed that each "Dn" (n=1, 2, 3, 4, 5) near each logical element "Cn" (n=1, 2, 3, . . . , 8, 9, 10) in the 'general logical structure model' is associated as a similar node by the processing of steps S132 to S140 of the logical structure matching processing of FIG. 6.

Based on the understanding above, FIG. 9 shows an overview of processing for examining whether or not the logical structure below the 'reference node' in the logical structure obtained from the input form holds in the 'general logical structure model'. Here, the similar logical structure is estimated for up to five "Dns" (n=1, 2, 3, 4, 5) in descending order of the degrees of similarity.

First, with "D2" with the highest degree of similarity and "C5", which is the logical element in the 'general logical structure model' corresponding to "D2", serving as 'reference nodes', it can be seen that "C9" and "D5", which are associated with "D2" and "D5", with the next higher degree of similarity to the 'reference node' are present at a lower level from the 'reference nodes'. Therefore, it is estimated that the logical structure of "D2", "D4" and "D5" match the logical structure of "C5", "C9" and "C10".

Next, the inter-node relationship between "C6" corresponding to "D3" with the next higher degree of similarity to "D4" and "D5" and "C10" is saved. Finally, the inter-node relationship (logical structure) between "C1" corresponding to "D1" and "C6" is saved. It can be seen that the logical structure of each of the logical elements "C5", "C9", "C10", "C6" and "C1", which has been saved in this manner, matches the logical structure of the 'headings' in the input form.

Next, an example of a display screen displayed on the display screen of the output device 106 to the user in step S148 of the logical structure matching processing of FIG. 7 will be described with reference to FIGS. 10A to 12. Note that, hereinafter, it is assumed that the logical elements, the designations of the logical elements and the logical structure among the logical elements in the 'general logical structure model', which matches the logical structure in the input form, are estimated, and the result of this estimation is shown by way of a tree structure.

Figure 10A:
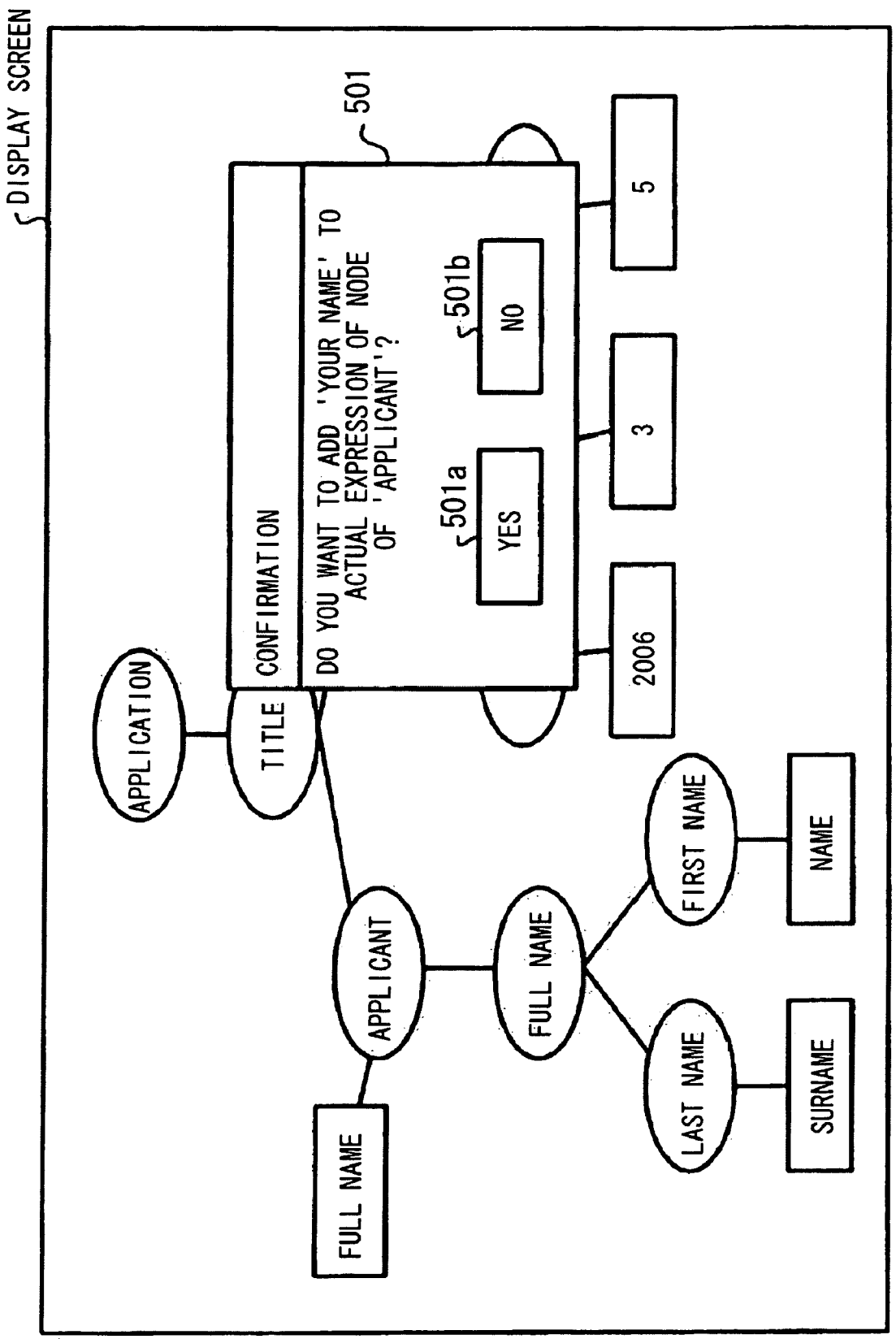
FIG. 10A is a diagram illustrating an example of a confirmation screen, which is displayed when an actual expression is added to a node (when the actual expression is added to a correct node) according to an example embodiment of the present invention.

FIG. 10A is a diagram illustrating an example of a confirmation screen, which is displayed when an actual expression is added to a node (when the actual expression is added to a correct node) according to an example embodiment of the present invention. FIG. 10B is a diagram illustrating an example of a display screen in which the actual expression has been added to the node according to an example embodiment of the present invention. In FIG. 10A, on the display screen, when it is determined that 'your name' should be added to the existing 'full name' as the 'actual expression' of the node of the 'applicant' (logical element), a confirmation screen 501 is displayed for inquiring the user whether it can be actually added. At that time, since it is appropriate that 'your name' is added to the 'actual expression' of the node of the 'applicant', the user clicks and presses "yes" on the operation display unit 501a with a mouse or the like. Then, as shown in FIG. 10B, 'your name' is added and displayed together with the existing 'full name' to the 'actual expression' of the node of the 'applicant'.

Figure 11A:
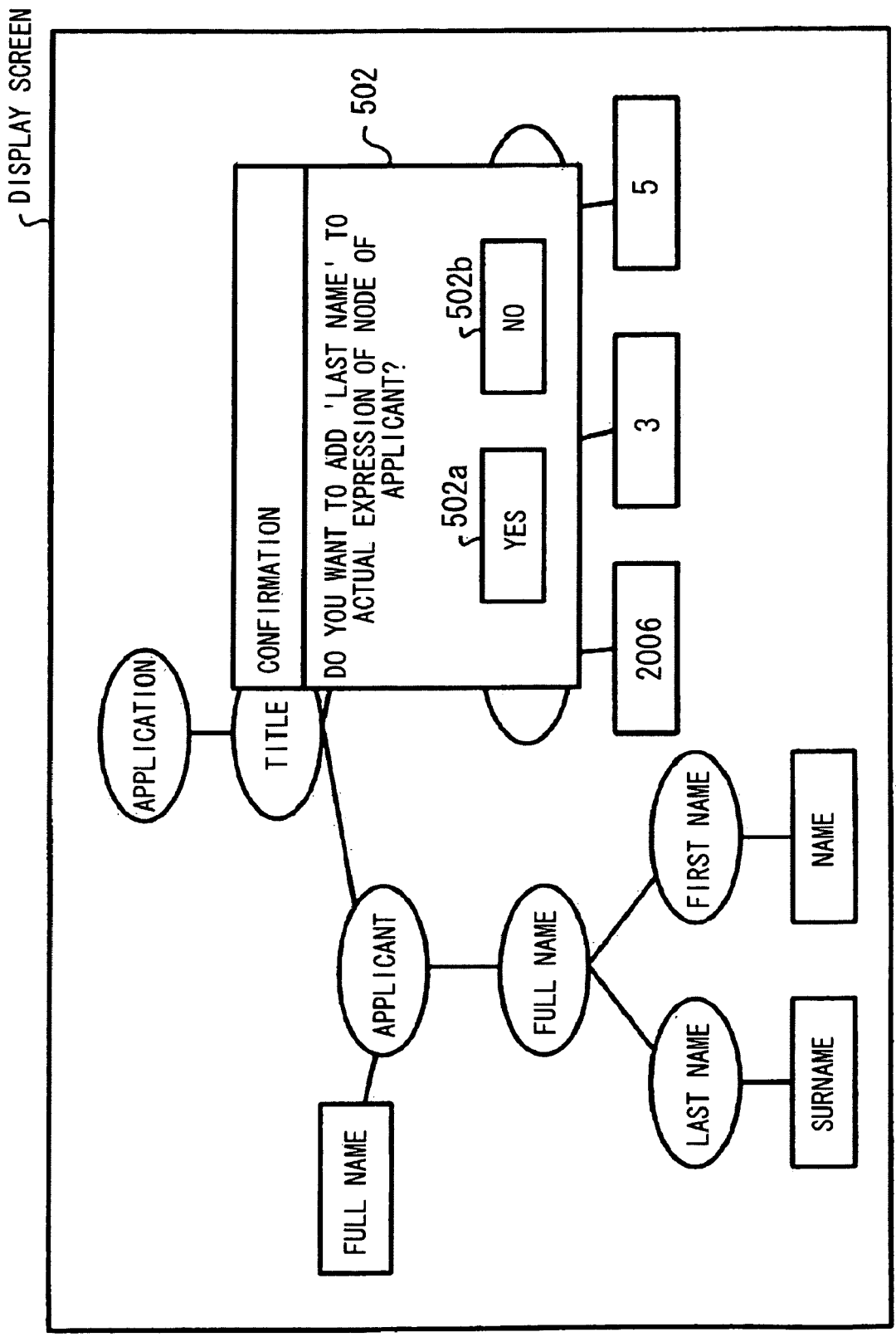
FIG. 11A is a diagram showing an example of the confirmation screen, which is displayed when an actual expression is added to a node (when the actual expression is added to an incorrect node) according to an example embodiment of the present invention.
Figure 11B:
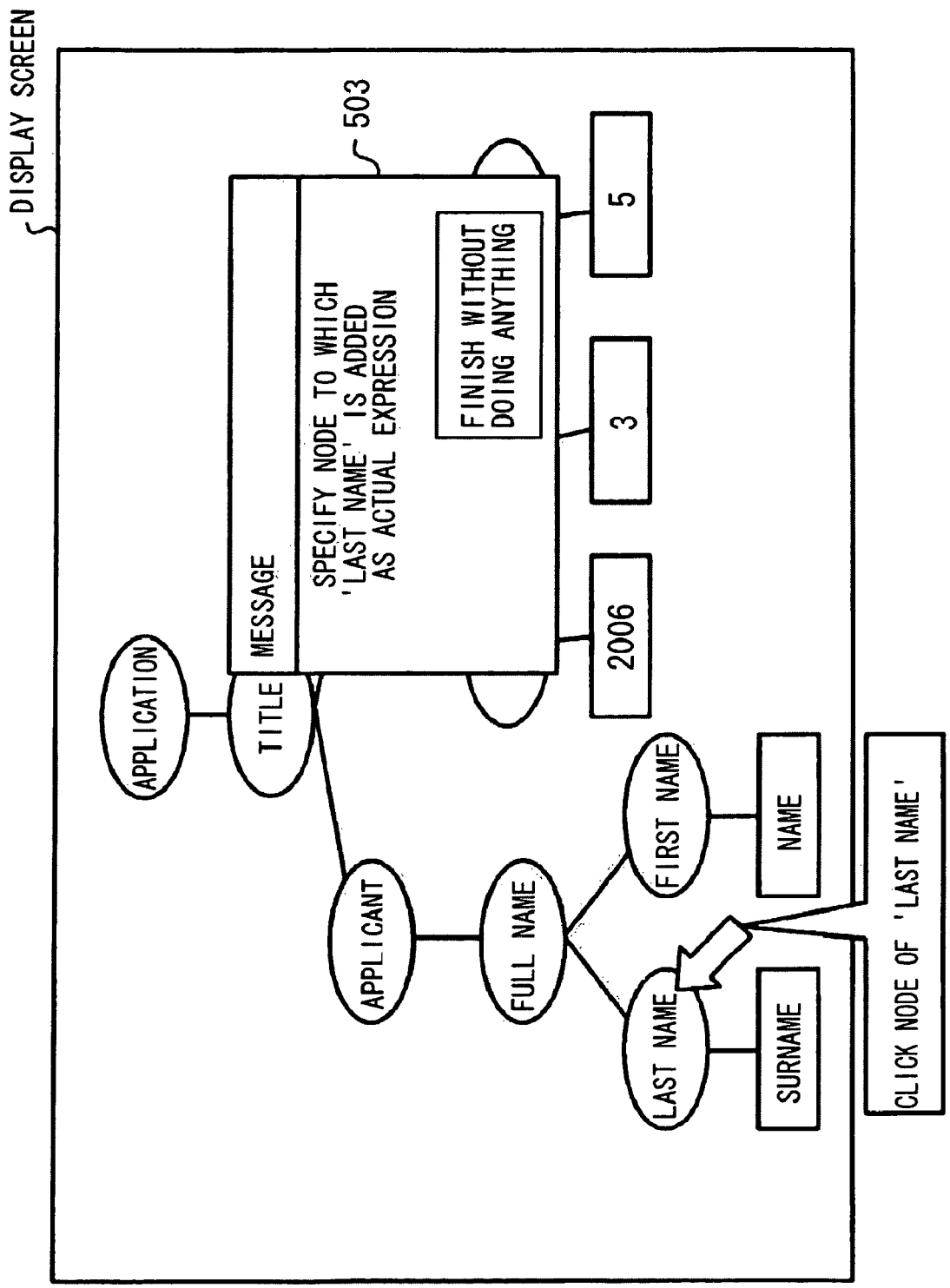
FIG. 11B is a diagram illustrating an example of a message screen, which is displayed to prompt to specify a correct node to which the actual expression is added according to an example embodiment of the present invention.
Figure 11C:
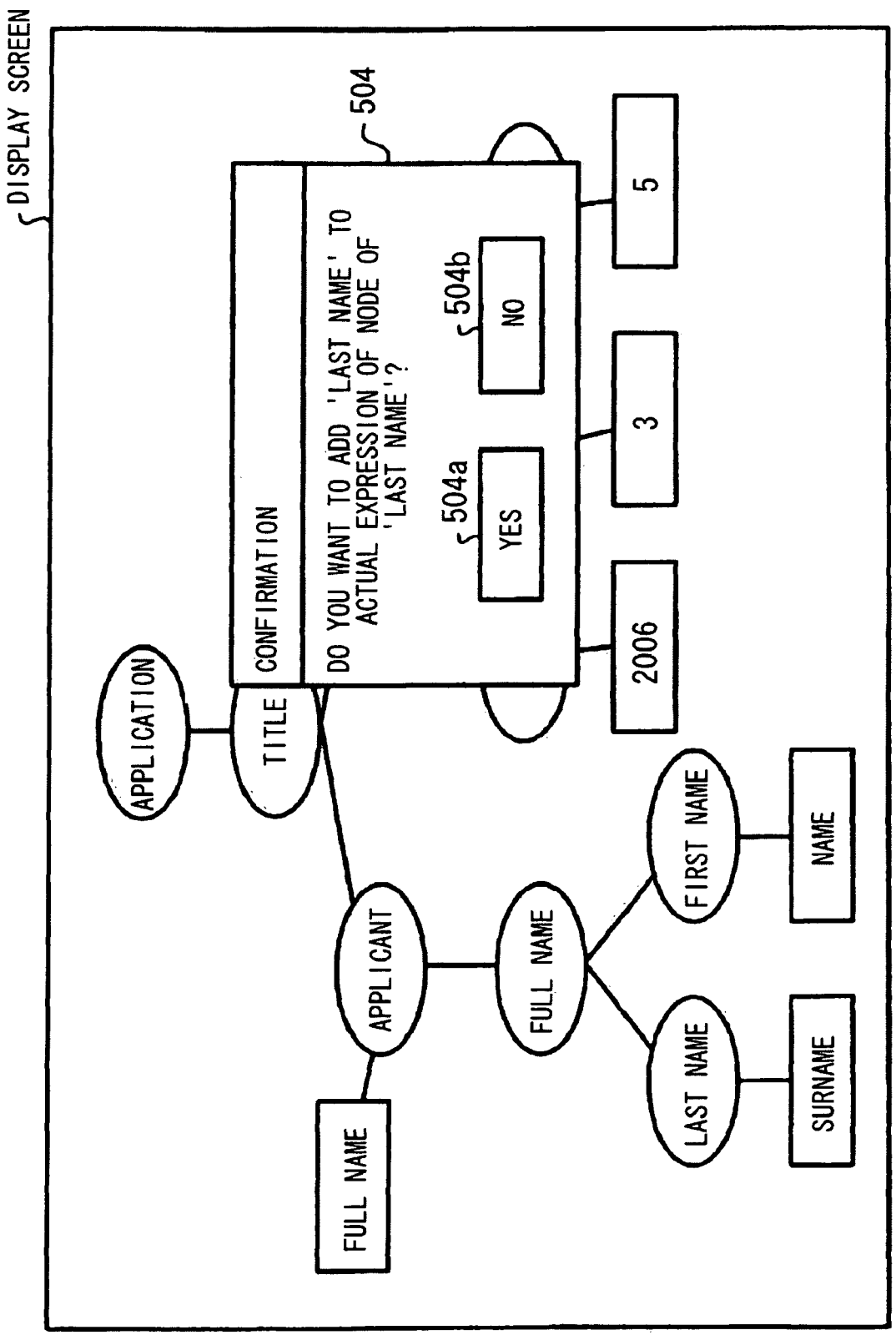
FIG. 11C is a diagram illustrating an example of the confirmation screen, which is displayed when an actual expression is added to a node (when the actual expression is added to a correct node) according to an example embodiment of the present invention.
Figure 11D:
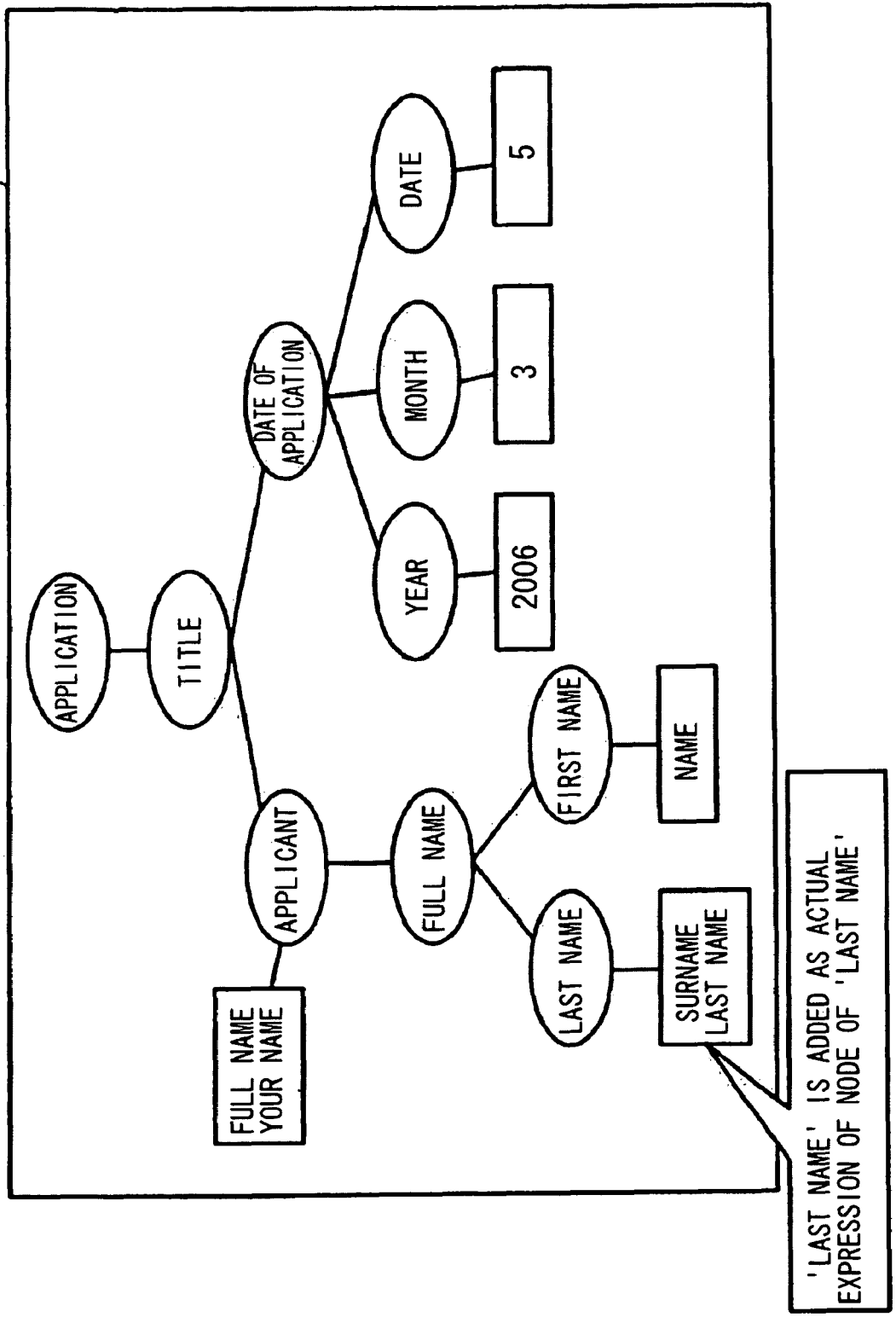
FIG. 11D is a diagram illustrating an example of the display screen in which the actual expression has been added to the node according to an example embodiment of the present invention.

FIG. 11A is a diagram showing an example of a confirmation screen, which is displayed when an actual expression is added to a node (when the actual expression is added to an incorrect node) according to an example embodiment of the present invention. FIG. 11B is a diagram illustrating an example of a message screen, which is displayed to prompt to specify a correct node to which the actual expression is added according to an example embodiment of the present invention. FIG. 11C is a diagram illustrating an example of the confirmation screen, which is displayed when an actual expression is added to a node (when the actual expression is added to a correct node) according to an example embodiment of the present invention. FIG. 11D is a diagram illustrating an example of the display screen in which the actual expression has been added to the node according to an example embodiment of the present invention.

In FIG. 11A, on the display screen, when it is determined that 'last name' should be added to the existing 'full name' as the 'actual expression' of the node of the 'applicant' (logical element), a confirmation screen 502 is displayed for inquiring the user whether it can be actually added. At that time, since it is not appropriate that 'last name' is added to the 'actual expression' of the node of the 'applicant', the user clicks and presses "no" on the operation display unit 502b with a mouse or the like.

Then, as shown in FIG. 11B, a message screen 503 is further displayed to prompt the user to specify a node to which 'last name' is added as the 'actual expression'. The user determines that it is appropriate that 'last name' is added to the node of 'last name' as the 'actual expression', and clicks the node of the 'last name' with a mouse or the like. Then, as in FIG. 11A, as shown in FIG. 11c, a confirmation screen 504 is displayed on the display screen for inquiring the user whether the 'last name' can be actually added to the existing 'surname' as the 'actual expression' of the node of the 'last name' (logical element). At that time, since it is appropriate 'last name' is added to the 'actual expression' of the node of 'last name', the user clicks and presses "yes" on the operation display unit 501a with a mouse or the like. Then, as shown in FIG. 11D, 'last name' is added and displayed together with the existing 'surname' to the 'actual expression' of the node of the 'last name'.

Figure 12:
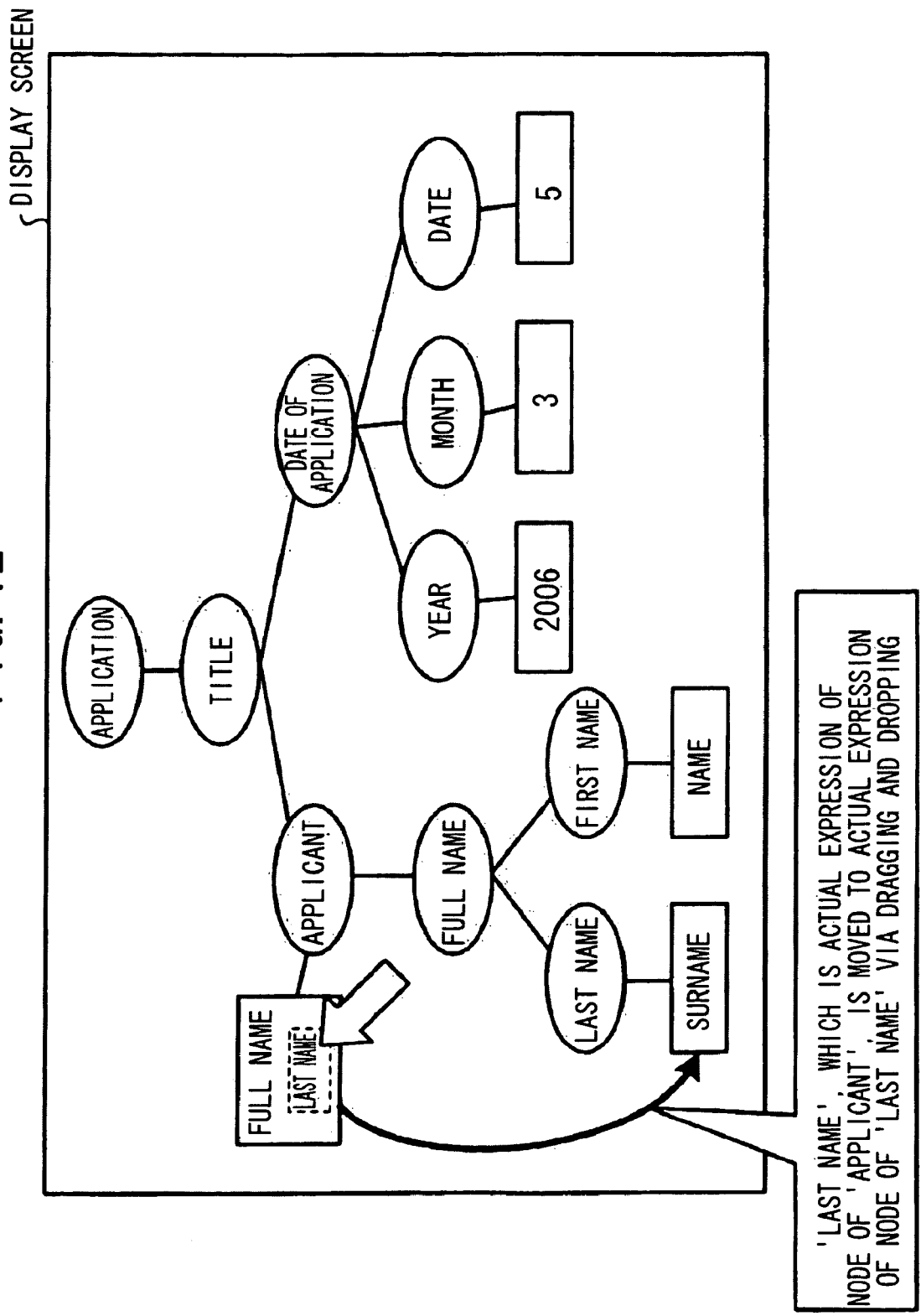
FIG. 12 is a diagram illustrating an example of the display screen when the actual expression is moved from one node to another node via dragging and dropping according to an example embodiment of the present invention.

Note that the user can change the node (logical element) with which an 'actual expression' is associated at any time via dragging and dropping with a mouse or the like, which is the input device 105, while viewing the display screen displayed on the output device 106. FIG. 12 is a diagram illustrating an example of a display screen when the actual expression is moved from one node to another node via dragging and dropping, according to an example embodiment of the present invention.

As shown in FIG. 12, on the display screen, 'full name' and 'last name' are associated with each other as the 'actual expression' of the node of the 'applicant'. However, it is assumed that the user determines that 'last name' is not appropriate as the 'actual expression' of the node of the 'applicant', and that 'last name is appropriate to be the 'actual expression' of the node of the 'last name' (logical element). Then, the user can move the 'actual expression' of 'last name' to the display portion of the 'actual expression' of 'last name' via dragging and dropping with the mouse.

In the embodiment 1 of FIG. 1, for example, described above, a model in an initial state of the 'general logical structure model' stored in the general logical structure model DB 102a has not been mentioned. The model in the initial state of the 'general logical structure model' may be created manually by specifying a number of logical elements having a hierarchical logical structure and providing designation.

The contents of the 'general logical structure model' become filled by entering information from many forms, which, accordingly, improves the degree of similarity of the estimated logical structure and accuracy in specifying the addition node for an addition/update candidate of an 'actual expression'. However, when it is desirable from an early stage to ensure to some extent the accuracy in recognizing a form to be recognized, manually creating a 'general logical structure model' can sometimes be a tedious work.

For a certain form, when a form, which has not filled out yet, is obtained, the general logical structure model creation assistance device 100 can use the result of the logical structure analysis of the form by the image recognition processing device 200 to create the 'general logical structure model' in an initial state. Since a class name is a concept, it should be entered manually, however, the name of the heading described in the form may be used as is.

However, when only a written form is obtained, a method according to another described below may be used, e.g., see FIG. 13, which illustrates an example of the general logical structure model creation by inputting a plurality of the same type of written forms according to an example embodiment of the present invention. The configuration of the general logical structure model creation assistance device of FIG. 13 may be, e.g., the same as that of the general logical structure model creation assistance device of FIG. 2, hence, the description thereof will be omitted.

Figure 13:
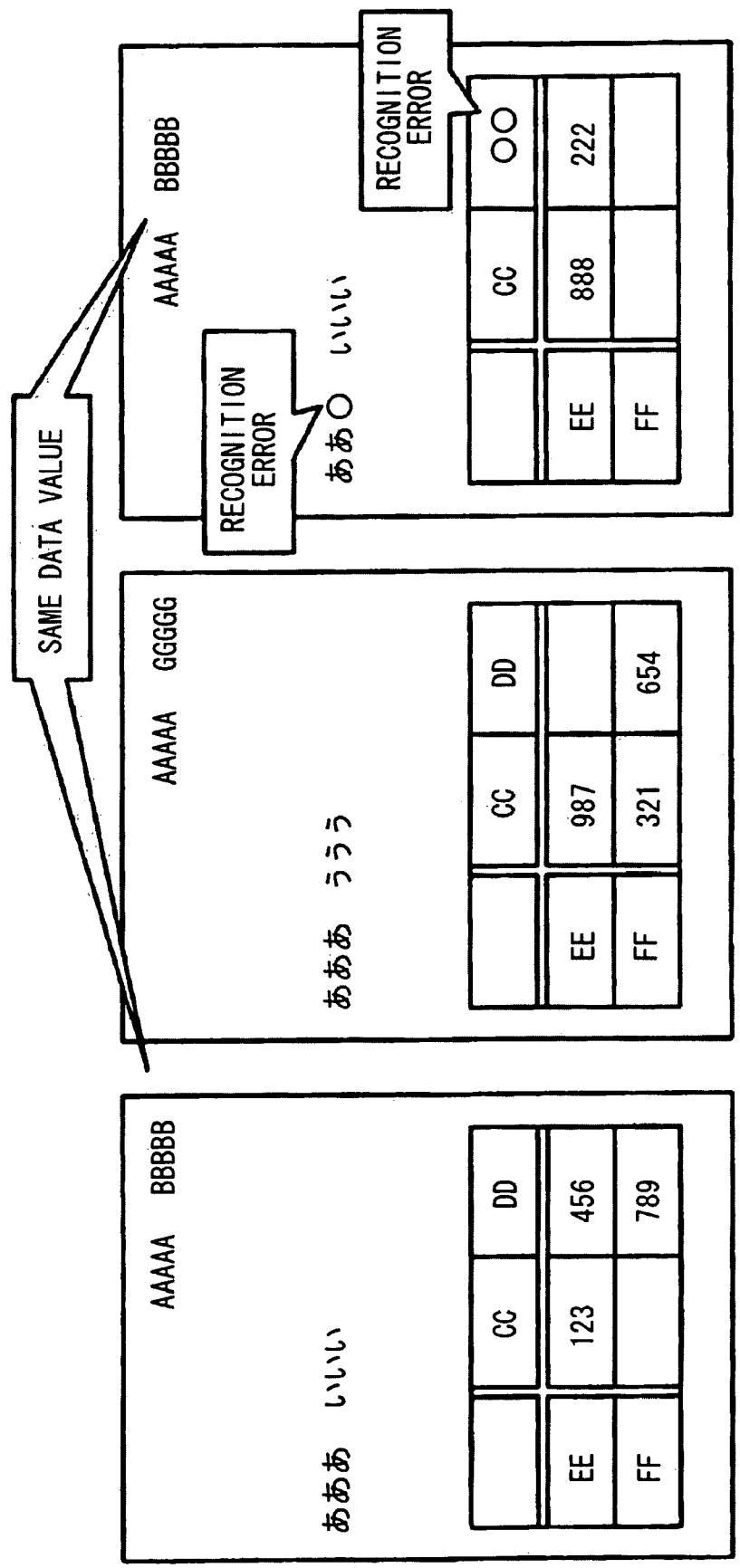
FIG. 13 is a diagram illustrating an example of the general logical structure model creation by inputting a plurality of the same type of written forms according to an example embodiment of the present invention.

In FIG. 13, the general logical structure model creation may occur by inputting a plurality of the same type of written forms. A plurality of written forms are used to obtain a logical structure by the image recognition processing device 200. In the logical structure, information on the position within the paper is set to be outputted.

Here, for a portion that is filled in the form already from the beginning, the same character string appears at the same position even among a plurality of written forms. When a coordinate and the character string match, this portion is assumed as a 'heading'. In addition, a character string, which is written at the same position nearby, but is not always identical, can be estimated to be a portion to be filled with 'data'.

Although the image recognition processing device 200 might make a mistake of character recognition, by using the degree of matching of the recognition results of the plurality of forms and the frequency information, it is determined whether or not there is error, and a correct character string can be extracted. That is to say, it is estimated that a character string recognized in the most form is a correct character string among character strings appearing on the same coordinate.

Referring to FIG. 13, "AAAAA" is considered as a 'heading' because the same character string appears on the same coordinate of all the forms. Further, although "BBBBB", "GGGGG" and "BBBBB" are written in the same position near "AAAAA", they are not always the same character strings, therefore, they are considered as 'data'.

Further, for "あああ",although the same character string "あああ"appears on the same coordinate in the two forms, a different character string あ○"appears on the same coordinate in another form. Since the number of forms in which "あああ"has been character-recognized is greater (the frequency is higher), "ああ○"is also assumed to be "あああ"and is considered to be a 'heading'. Similarly, for "DD", although the same character string "DD" appears on the same coordinate in the two forms, a different character string "○○" appears on the same coordinate in another form. Since the number of forms in which "DD" has been character-recognized is greater (the frequency is higher), "○○" is also assumed to be "DD" and is considered as a 'heading'.

Figure 14A:
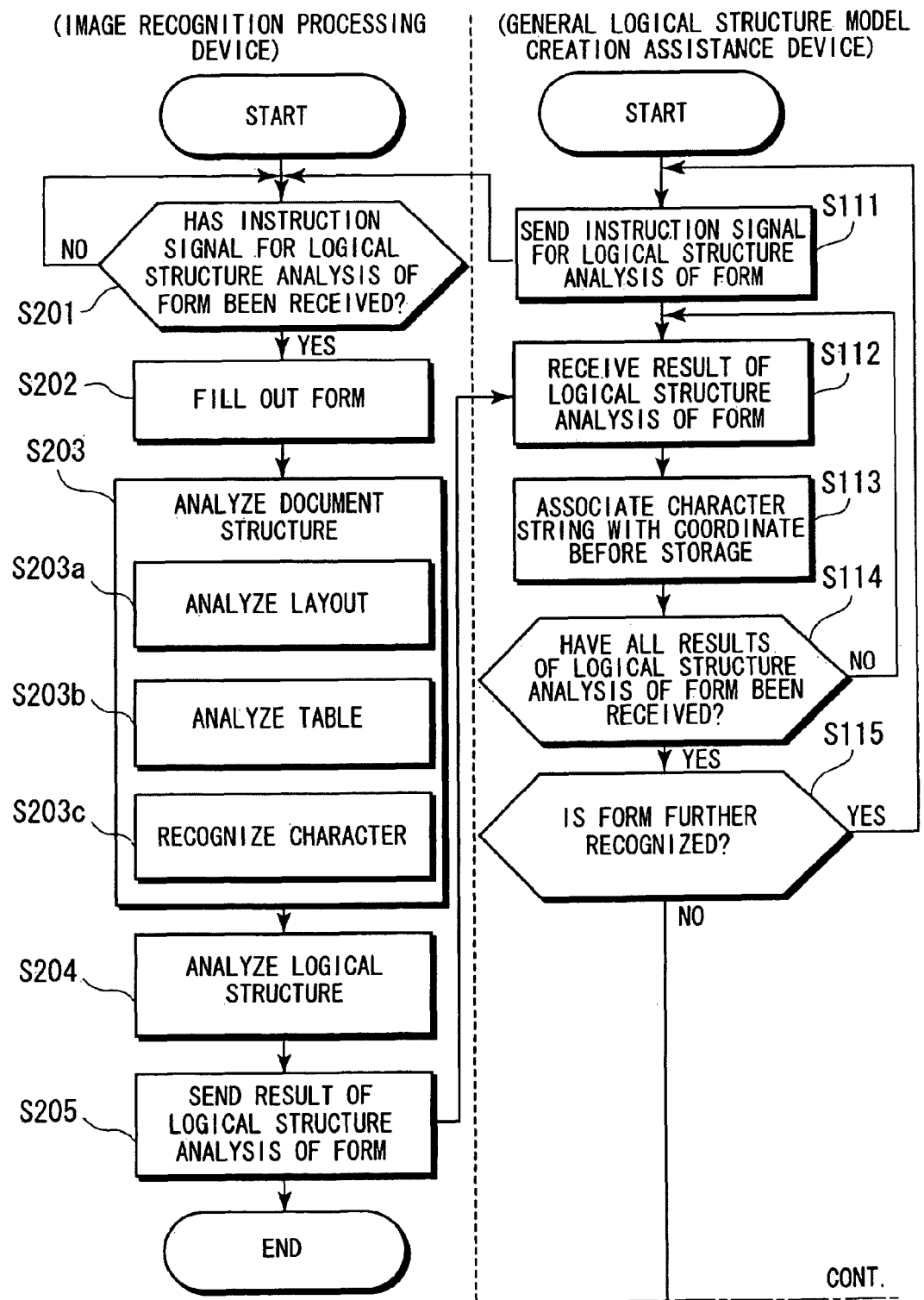
FIG. 14A~14B together are a flow chart illustrating a general logical structure model creation processing procedure by inputting a plurality of the same type of written forms according to an example embodiment of the present invention.
Figure 14B:
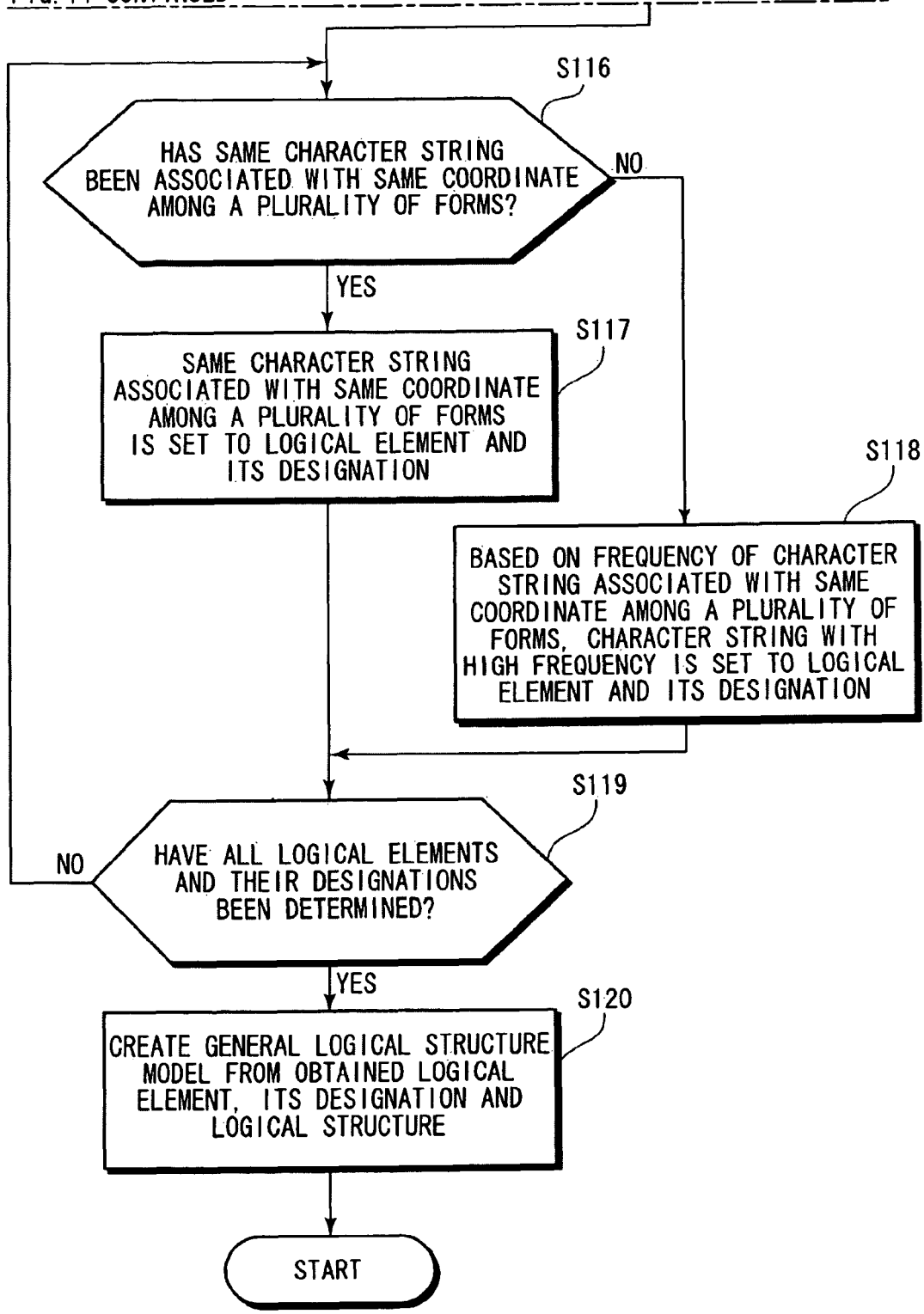

Next, a general logical structure model creation processing by inputting a plurality of the same type of written forms will be described. FIGS. 14A and 14B together are a flow chart illustrating a general logical structure model creation processing procedure by inputting a plurality of the same type of written forms according to an example embodiment of the present invention.

As shown in FIGS. 14A and 14B, first, the logical structure management processing unit 101a in the general logical structure model creation assistance device 100 sends an instruction signal for logical structure analysis of form to the image recognition processing device 200 (step S111).

When receiving the instruction signal for logical structure analysis of form from the logical structure management processing unit 101a in the general logical structure model creation assistance device 100, the document structure analysis processing unit 201a in the image recognition processing device 200 may perform the same processing as that of step S201 to step S205 of FIG. 4.

Note that the character recognition of step S203c by the character recognition processing unit 201b in the image recognition processing device 200 recognizes a character (or a character string), and obtains a coordinate in the input form of the character (or the character string). Then, in step S205, the result of logical structure analysis of form, including the coordinate in the input form of the obtained character (or character string), is sent to the general logical structure model creation assistance device 100.

The logical structure management processing unit 101a in the general logical structure model creation assistance device 100 receives the result of logical structure analysis of form from the image recognition processing device 200 (step S112). Then, the logical structure management processing unit 101a associates the character string included in the received result of logical structure analysis of form with the coordinate, and stores the resulting data/information (step S113).

Then, the logical structure management processing unit 101a in the general logical structure model creation assistance device 100 determines whether or not all the results of logical structure analysis of form have been received (step S114). When it is determined that all the results of logical structure analysis of form have been received (step S114 positive), the process goes to step S115, on the other hand, when it is not determined that all the results of logical structure analysis of form have been received (step S114 negative), the process goes to step S112.

In step S115, the logical structure management processing unit 101a in the general logical structure model creation assistance device 100 determines whether or not the form is further recognized by a user instruction. When it is determined that the form is further recognized (step S115 positive), the process goes to step S111, on the other hand, when it is not determined that the form is further recognized (step S115 negative), the process goes to step S116.

In step S116, the logical structure management processing unit 101a of the general logical structure model creation assistance device 100 determines whether or not the same character string is associated with the same coordinate among a plurality of recognized forms. When it is determined that the same character string is associated with the same coordinate (step S116 positive), the process goes to step S117, on the other hand, when it is not determined that the same character string is associated with the same coordinate (step S116 negative), the process goes to step S118.

In step S117, the logical structure management processing unit 101a in the general logical structure model creation assistance device 100 sets the same character string associated with the same coordinate among a plurality of recognized forms to a logical element and the designation of the logical element. When this processing is finished, the process goes to step S119.

Meanwhile, in step S118, the logical structure management processing unit 101a in the general logical structure model creation assistance device 100 sets a character string with higher frequency, based on the frequency of the character string associated with the same coordinate, among a plurality of recognized forms to a logical element and the designation of the logical element. When this processing is finished, the process goes to step S119.

In step S119, the logical structure management processing unit 101a in the general logical structure model creation assistance device 100 determines whether or not all the logical elements and the designations have been determined. When it is determined that all the logical elements and the designations have been determined (step S119 positive), the process goes to step S120, on the other hand, when it is not determined that all the logical elements and the designations are determined (step S119 negative), the process goes to step S116.

In step S120, the logical structure management processing unit 101a in the general logical structure model creation assistance device 100 creates a 'general logical structure model' from the obtained logical elements, designations and logical structure.

Conventionally, in order to create a 'general logical structure model', the logical structure of a form would have had to have been found manually. By contrast, according to at least one embodiment of the present invention, since the extraction of a 'heading' from a form and the position of a candidate in the logical structure corresponding to the 'heading' can be searched automatically, the user only needs to perform confirmation. The contents of the 'general logical structure model' become filled by entering information from many forms, which, accordingly, improves the accuracy in a candidate position in the logical structure corresponding to the estimated 'heading'. As a result, time and cost for the confirmation are also reduced.

The general logical structure model creation assistance device 100 is a device for assisting in an operation of adding an 'actual expression' to each logical element in a 'general logical structure model'. However, with the same approach as that of assisting in an operation of adding an 'actual expression', the addition of a 'logical element' to the logical structure of the 'general logical structure model' may be assisted. Also in this case, similarly to when assisting in the operation of adding an 'actual expression', the addition of a logical structure to any user-chosen position and the determination of a designation of the logical structure may be assisted by way of a simple operation such, e.g., a mouse operation on a GUI.

Further, regarding the example embodiments, all or some of the processing described as being performed automatically may be performed manually, alternatively, all or some of the processing described as being performed manually may be performed automatically by a known method. In addition, the processing procedure, control procedure, concrete designation and information including various data and parameters, which are described in the above embodiments, may be modified in any manner unless explicitly indicated.

Each component of each device illustrated is functionally conceptualistic, and it is not necessarily required to be physically constituted as shown. That is to say, the concrete form of distribution and integration of each device is not limited to those illustrated, and all or some of them may be constituted, functionally or physically distributed or integrated in any unit according to various load and usage conditions.

More specifically, the general logical structure model creation assistance device 100, the terminal device 104, the image recognition processing device 200 and the scanner device 203 may be physically integrally constituted. In addition, the general logical structure model creation assistance device 100 and the image recognition processing device 200 may be physically integrally constituted.

Further, all or some of each processing function performed in each device is implemented in a central processing unit (CPU) (or a microcomputer such as a micro processing unit (MPU) or micro controller unit (MCU)), and a program analyzed and executed in the CPU (or a microcomputer such as MPU or MCU), or may be implemented as hardware by a wired logic.

According to the configuration described above, a character string associated with the logical element stored in the logical structure model, and a character string in the input image corresponding to the logical element based on the logical structure among character strings in the input image extracted from the input image are displayed as an update candidate for a character string associated with the logical element, thus exerting an effect of reducing the workload when adding the character string in the input image to the character string associated with the logical element.

Further, according to the configuration described above, among a plurality of selected logical elements, starting from a reference logical element, the degrees of similarity between the character strings associated respectively with a logical element at an upper level, a logical element at a lower level or a logical element at the same level in the hierarchical structure, and the character strings associated respectively with the plurality of logical elements extracted from the input image are determined, and based on the result of the determination, the degree of similarity between the logical structure stored in the logical structure model and the logical structure among the character strings in the input image is estimated, thus exerting an effect of quickly grasping the logical structure among the character strings in the input image.

Moreover, according to the configuration described above, the logical structure model includes logical elements for each of several different types of images, character strings associated respectively with the logical elements, and the logical structure for each of several different images, thus exerting an effect of storing in one logical structure model, the logical elements for each of several different types of images, the character strings associated respectively with the logical elements, and the logical structure for each of several different images.

Furthermore, according to the configuration described above, the character string associated with each of the logical elements in the logical structure model includes a designation of the logical element and an actual expression of the logical element, thus exerting an effect of enabling association to an identical logical element even if the character string is expressed with a different expression, as long as the character string has an identical semantic content.

Further, a logical element is selected among a plurality of logical elements according to the configuration described above, according to the degrees of similarity between the character strings in the input image extracted from an input image, and the designations of each of the plurality of logical elements and/or the actual expressions of the logical elements, stored in the logical structure model, thus exerting an effect of determining that the character string is a similar one even if the character string is expressed with a different expression, as long as the character string has substantially similar if not identical semantic content.

Moreover, according to the configuration described above, for a plurality of selected logical elements, according to the priority, the degree of similarity between the designation of the logical element and/or the actual expression of the logical element associated respectively with a logical element at an upper level, a logical element at a lower level or a logical element at the same level in the hierarchical structure of the reference logical element and the character strings in the input image extracted from the input image is determined, and, based on the result of the determination, the degree of similarity between the logical structure stored in the logical structure model, and the logical structure among the character strings in the input image extracted from the input image is estimated, thus exerting an effect of determining that the character string has the similar logical structure even if the character string is expressed with a different expression, as long as the character string has substantially similar if not identical semantic content.

Furthermore, according to the configuration described above, the character strings associated with the logical elements included in the logical structure of the logical structure model for which the degree of similarity to the logical structure among the character strings in the input image extracted from the input image, and character strings in the input image associated with the logical elements, based on the logical structure among the character strings in the input image extracted from the input image are extracted, thus exerting an effect of reducing the workload when adding the character string in the input image to a character string associated with the logical element that has been determined to be a similar logical structure due to the character string being deemed to have substantially similar if not identical semantic content even if the character string is expressed with a difference expression.

Further, according to the configuration described above, when no character string associated with the logical element stored in the logical structure model, and no logical element associated with the character string in the input image extracted from the input image exist in the logical structure model, based on the degree of similarity between the logical structure stored in the logical structure model and the logical structure among the character strings in the input image, a new logical element is displayed as an addition candidate, which is to be added to the logical structure model so as to be associated with the character string in the input image, thus exerting an effect of reducing the workload when adding a new logical element to the logical structure model so as to be associated with the character strings in the input image.

Moreover, according to the configuration described above, an update candidate for the character string associated with the logical element in the logical structure model and/or a modification to the logical element to be added to the logical structure model are received, and, based on the modification result, the logical structure model is updated, thus exerting an effect of updating the character string and/or adding the logical structure to the logical structure model, while the user is confirming. At least one embodiment of the present invention may also be embodied as computer readable medium including executable instructions that are recorded on a computer readable recording medium. The computer readable medium is any data storage device that can store the data, including the executable instructions, and which can be read by a computer system so as to provide the computer system with the executable instructions included in the recorded data for execution. Examples of the computer readable recording medium include read-only memory (ROM), random-access memory (RAM), CD-ROMs, magnetic tapes, floppy disks, and optical data storage devices. The computer readable recording medium may also be distributed over network coupled computer systems so that the computer readable code is stored and executed in a distributed fashion.

Example embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made therein without departing from the spirit and scope of the present invention as set forth in the claims.

What is claimed is:

1. A non-transitory computer-readable recording medium that, when read and executed by a computer causes the same to perform a logical structure model creation assistance method for assisting in the creation of a logical structure model, which stores, from an image in which character strings associated respectively with a plurality of logical elements constituting a logical structure are described, the logical elements, character strings associated with the logical elements, and the logical structure, the method comprising:
    firstly extracting character strings in an input image and the logical structure among the character strings in the input image;
    selecting one among the plurality of logical elements according to degrees of similarity between the extracted character strings in the input image and the character strings associated respectively with the plurality of logical elements stored in the logical structure model;
    secondly extracting a character string associated with the selected logical element and a character string in the input image associated with the logical element based on the logical structure among the extracted character strings in the input image; and
    displaying the extracted character string as an update candidate for the character string associated with the selected logical element.

2. The non-transitory computer-readable recording medium according to claim 1, wherein,
    the logical structure of the logical structure model has a hierarchical structure,
    the selecting assigns the order of priority and selects several logical elements among the plurality of logical elements, according to degrees of similarity between the extracted character strings in the input image and the character strings associated respectively with the plurality of logical elements stored in the logical structure model, and lets the logical element with the highest priority to be a reference logical element,
    and further comprising, determining, for the several selected logical elements according to the priority, the degrees of similarity between the character strings associated respectively with a logical element at an upper level, a logical element at a lower level or a logical element at the same level in the hierarchical structure of the reference logical element and the character strings associated respectively with the plurality of extracted logical elements, and estimating, based on the result of the determination, the degree of similarity between the logical structure stored in the logical structure model, and the logical structure among the extracted character strings in the input image.

3. The non-transitory computer-readable recording medium according to claim 2, wherein,
    the secondly extracting extracts character strings associated with the logical elements included in the logical structure of the logical structure model for which the degree of similarity to the logical structure among the extracted character strings in the input image has been estimated and character strings in the input image associated with the logical elements based on the logical structure among the extracted character strings in the input image.

4. The non-transitory computer-readable recording medium according to claim 1, wherein,
    the logical structure model includes the logical elements for each of several different types of images, character strings associated respectively with the logical elements, and the logical structure for each of the several different images.

5. The non-transitory computer-readable recording medium according to claim 1, wherein,
    the character string associated with each of the logical elements in the logical structure model includes a designation of the logical element and an actual expression of the logical element, and a limit condition for an attribute of the character string is established to the actual expression.

6. The non-transitory computer-readable recording medium according to claim 5, wherein,
    the selecting selects a logical element among the plurality of logical elements according to the degrees of similarity between the extracted character strings in the input image, and at least one of the designations of each of the plurality of logical elements and the actual expressions of the logical elements, stored in the logical structure model.

7. The non-transitory computer-readable recording medium according to claim 5, wherein,
    the estimating determines, for the several selected logical elements according to the priority, the degree of similarity between the designation of the logical element and/or the actual expression of the logical element associated respectively with a logical element at an upper level, a logical element at a lower level or a logical element at the same level in the hierarchical structure of the reference logical element and the extracted character strings, and estimates, based on the result of the determination, the degree of similarity between the logical structure stored in the logical structure model, and the logical structure among the extracted character strings in the input image.

8. The non-transitory computer-readable recording medium according to claim 1, further comprising:
    displaying, when no logical element has been selected among the plurality of logical elements, based on the estimated degree of similarity between the logical structure stored in the logical structure model and the logical structure among the extracted character strings in the input image a logical element to be associated with a character string in the input image and added to the logical structure model, as an additional logical element candidate together with an addition position.

9. The non-transitory computer-readable recording medium according to claim 1, further comprising:
    receiving a modification to an update candidate for the character string associated with the selected logical element, and
    at least one of updating the character string associated with the logical element in the modified update candidate for the character string, and receiving a modification to the designation and the addition position of the logical element to be associated with the character string in the input image and added to the logical structure model, which are displayed, and adding the logical element to the logical structure model with the modified designation and at the addition position.

10. A logical structure model creation assistance device for assisting in the creation of a logical structure model, which stores, from an image in which character strings associated respectively with a plurality of logical elements constituting a logical structure are described, the logical elements, character strings associated respectively with the logical elements, and the logical structure, the device comprising:
   a memory to store the logical structure model;
   a character string logical structure extraction unit to store a character string in an input image and the logical structure among the character strings in the input image based on a result of recognition of the input image;
   a logical element selection unit to select a logical element among the plurality of logical elements according to the degrees of similarity between the character strings in the input image extracted by the character string logical structure extraction unit and the character strings associated respectively with the plurality of logical elements stored in the logical structure model;
   a character string extraction unit to extract a character string associated with the selected logical element and a character string in the input image associated with the logical element based on the logical structure among the character strings in the input image extracted by the character string logical structure extraction unit; and
   a display unit to display the character string extracted by the character string extraction unit as a candidate update target for the character string associated with the logical element selected by the logical element selection unit.

11. The logical structure model creation assistance device according to claim 10, wherein,
   the logical structure of the logical structure model stored in the logical structure model has a hierarchical structure,
   the logical element selection unit assigns the order of priority and selects several logical elements among the plurality of logical elements, according to the degrees of similarity between the extracted character strings in the input image, and the character strings associated respectively with the plurality of logical elements stored in the logical structure model, letting the logical element with the highest priority to be a reference logical element,
   and further comprising, a logical structure similarity estimation unit to determine, for the several logical elements selected by the logical element selection unit, according to the priority, the degrees of similarity between the character strings associated with a logical element at an upper level, a logical element at a lower level or a logical element at the same level in the hierarchical structure of the reference logical element and the character strings associated with the plurality of extracted logical elements, and estimates, based on the result of the determination, the degree of similarity between the logical structure of the logical structure model and the logical structure among the extracted character strings in the input image.

12. The logical structure model creation assistance device according to claim 11, wherein,
   the character string extraction unit extracts character strings associated with the logical elements included in the logical structure of the logical structure model for which the degree of similarity to the logical structure among the extracted character strings in the input image has been estimated, and character strings in the input image associated with the logical elements based on the logical structure among the extracted character strings.

13. The logical structure model creation assistance device according to claim 10, wherein,
   the logical structure model includes the logical elements for each of several different types of images, character strings associated respectively with the logical elements, and the logical structure for each of the several different images.

14. The logical structure model creation assistance device according to claim 10, wherein,
   the character string associated with each of the logical elements in the logical structure model includes a designation of the logical element and an actual expression of the logical element, and a limit condition for an attribute of the character string is established to the actual expression.

15. The logical structure model creation assistance device according to claim 14, wherein,
   the logical element selection unit selects a logical element among the plurality of logical elements according to the degrees of similarity between the extracted character strings in the input image, and the designations of the plurality of logical elements and/or the actual expressions of the logical elements, stored in the logical structure model.

16. The logical structure model creation assistance device according to claim 14, wherein,
   the logical structure similarity estimation unit determines, for the several selected logical elements, according to the priority, the degree of similarity between the designation of the logical element and/or the actual expression of the logical element associated with a logical element at an upper level, a logical element at a lower level or a logical element at the same level in the hierarchical structure of the reference logical element and the extracted character strings in the input image, and estimates, based on the result of the determination, the degree of similarity between the logical structure stored in the logical structure model, and the logical structure among the extracted character strings in the input image.

17. The logical structure model creation assistance device according to claim 10, further comprising:
   an additional logical element candidate display unit, which, when no logical element has been selected among the plurality of logical elements stored in the logical structure model based on the estimated degree of similarity between the logical structure stored in the logical structure model and the logical structure among the extracted character strings in the input image, displays a logical element to be associated with a character string in the input image and added to the logical structure model, as an additional logical element candidate together with an addition position.

18. The logical structure model creation assistance device according to claim 10, further comprising:
   a logical structure model addition/update unit to do at least one of receive a modification to an update candidate for the character string associated with the selected logical element selected in the logical structure model, and update the character string associated with the logical element in the modified update candidate for the character string, and receive a modification to the designation and the addition position of the logical element to be associated with the character string in the input image and added to the logical structure model, and add the logical element to the logical structure model with the modified designation and at the addition position.

19. A logical structure model creation assistance method for assisting in the creation of a logical structure model, which stores, from an image in which character strings associated respectively with a plurality of logical elements constituting a logical structure are described, the logical elements, character strings associated with the logical elements, and the logical structure, the method comprising:

firstly extracting a character string in an input image and the logical structure among the character strings in the input image based on a result of recognition of the input image;

selecting one among the plurality of logical elements according to the degrees of similarity between the extracted character strings in the input image and the character strings associated respectively with the plurality of logical elements stored in the logical structure model;

secondly extracting a character string associated with the selected logical element and a character string in the input image associated with the logical element based on the logical structure among the extracted character strings in the input image; and displaying the extracted character string as a candidate update target for the character string associated with the selected logical element.

20. The logical structure model creation assistance method according to claim 19, wherein, the logical structure stored in the logical structure model has a hierarchical structure, the selecting assigns the order of priority and selects several logical elements among the plurality of logical elements, according to the degrees of similarity between the extracted character strings in the input image and the character strings associated respectively with the plurality of logical elements stored in the logical structure model, and lets the logical element with the highest priority to be a reference logical element, and further comprising, determining for the several selected logical elements according to the priority, the degrees of similarity between the character strings associated respectively with a logical element at an upper level, a logical element at a lower level or a logical element at the same level in the hierarchical structure of the reference logical element and the character strings associated respectively with the plurality of extracted logical elements, and estimating, based on the result of the determination, the degree of similarity between the logical structure stored in the logical structure model, and the logical structure among the extracted character strings in the input image.

* * * * *